US010654026B1

(12) United States Patent
Wendland et al.

(10) Patent No.: US 10,654,026 B1
(45) Date of Patent: May 19, 2020

(54) POLYMERIC SORBENTS FOR ALDEHYDES

(71) Applicant: 3M INNOVATIVE PROPERTIES COMPANY, St. Paul, MN (US)

(72) Inventors: Michael S. Wendland, North St. Paul, MN (US); Michael W. Kobe, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/619,347

(22) PCT Filed: Jun. 13, 2018

(86) PCT No.: PCT/IB2018/054312
§ 371 (c)(1),
(2) Date: Dec. 4, 2019

(87) PCT Pub. No.: WO2018/229677
PCT Pub. Date: Dec. 20, 2018

Related U.S. Application Data

(60) Provisional application No. 62/520,792, filed on Jun. 16, 2017.

(51) Int. Cl.
*B01J 20/26* (2006.01)
*B01J 20/28* (2006.01)
*B01D 53/02* (2006.01)
*B01J 20/30* (2006.01)

(52) U.S. Cl.
CPC ............ *B01J 20/265* (2013.01); *B01D 53/02* (2013.01); *B01J 20/3042* (2013.01); *B01D 2253/202* (2013.01); *B01D 2257/70* (2013.01)

(58) Field of Classification Search
CPC ..... B01J 20/265; B01J 20/3042; B01D 53/02; B01D 2253/202; B01D 2257/70
USPC ............. 96/108; 95/141, 900; 502/400, 402; 423/245.1
See application file for complete search history.

(56) References Cited

U.S. PATENT DOCUMENTS

| 3,799,870 | A | 3/1974 | Heilweil |
| 4,273,751 | A | 6/1981 | Sinha |
| 4,443,354 | A | 4/1984 | Eian |
| 4,677,096 | A | 6/1987 | Van der Smissen |
| 5,206,204 | A * | 4/1993 | Tsutsumi ................ A24D 3/14 423/245.1 |
| 6,596,909 | B2 * | 7/2003 | Nishijima .............. B01D 53/02 423/700 |
| 6,930,219 | B2 | 8/2005 | Shan |
| 7,559,981 | B2 | 7/2009 | Friday |
| 8,470,074 | B2 | 6/2013 | Baugh |
| 9,776,131 | B2 | 10/2017 | Eisenberger |
| 2003/0144421 | A1 | 7/2003 | Dixon |
| 2005/0000363 | A1 * | 1/2005 | Minemura ............ A61L 9/014 96/154 |
| 2008/0319097 | A1 | 12/2008 | Johannsen |
| 2009/0060809 | A1 | 3/2009 | Shioya |
| 2014/0186250 | A1 | 7/2014 | Levan |
| 2016/0311996 | A1 | 10/2016 | Wendland |
| 2017/0333870 | A1 | 11/2017 | Wendland |
| 2018/0345246 | A1 * | 12/2018 | Wendland ............. B01J 20/264 |
| 2019/0060870 | A1 * | 2/2019 | Kobe ..................... B01D 53/72 |
| 2019/0336942 | A1 * | 11/2019 | Jin ....................... B01J 20/3064 |

FOREIGN PATENT DOCUMENTS

| WO | WO 2011/035195 | 3/2011 |
| WO | WO 2015/095110 | 6/2015 |
| WO | WO 2015/095115 | 6/2015 |
| WO | WO 2016/081226 | 5/2016 |
| WO | WO 2016/186858 | 11/2016 |
| WO | WO 2016/205083 | 12/2016 |
| WO | WO 2016/205444 | 12/2016 |
| WO | WO 2017/106438 | 6/2017 |
| WO | WO 2017/106443 | 6/2017 |
| WO | WO 2017/160650 | 9/2017 |

OTHER PUBLICATIONS

Arean, "Carbon dioxide and nitrogen adsorption on porous copolymers of divinylbenzene and acrylic acid", Adsorption, Apr. 2013, vol. 19, No. 2-4, pp. 367-372.
Bicak, "Aldehyde Separation by Polymer-Supported Oligo (ethyleneimines)", Journal of Polymer Science: Part A: Polymer Chemistry, Jul. 1997, vol. 35, No. 14, pp. 2857-2864, XP55027595.
Bottcher, "Silica Sol-Gel Glasses with Embedded Organic Liquids", Advanced Materials, Feb. 1999, vol. 11, No. 2, pp. 138-141.
Carta, "Novel Spirobisindanes for Use as Precursors to Polymers of Intrinsic Microporosity", Organic Letters, 2008, vol. 10, No. 13, pp. 2641-2643.
Cecile, "Hydrophilic Polystyrene/Maleic Anhydride Ultrafine Fibrous Membranes", Journal of Applied Polymer Science, Jan. 2010, vol. 115, No. 2, pp. 723-730.
Chen, "Stability and Equilibrium Properties of Macroreticular Resins for Flue Gas Desulfurization", Industrial and Engineering Chemistry Research, 1990, vol. 29, No. 3, pp. 440-447, XP055356157.

(Continued)

*Primary Examiner* — Frank M Lawrence, Jr.
(74) *Attorney, Agent, or Firm* — Jean A. Lown

(57) ABSTRACT

Polymeric sorbents for aldehydes including formaldehyde are provided. More particularly, the polymeric sorbents are a reaction product of a hydrolyzed divinylbenzene/maleic anhydride polymeric material having carboxylic acid groups with a nitrogen-containing compound having at least two primary amino groups and/or secondary amino groups. The nitrogen-containing compound is ionically attached to the hydrolyzed divinylbenzene/maleic anhydride within the polymeric sorbent and has at least one primary amino and/or secondary amino group available for reacting with an aldehyde. Additionally, methods of making the polymeric sorbents, methods of sorbing aldehydes (i.e., aldehydes that are volatile under use conditions) on the polymeric sorbents, compositions resulting from the sorption of aldehydes on the polymeric sorbents, composite granules containing the polymeric sorbents, methods of making the composite granules, and methods of sorbing aldehydes on the composite granules are provided.

14 Claims, No Drawings

(56) References Cited

OTHER PUBLICATIONS

Chowdhury, "Synthesis and characterization of radiation grafted films for removal of arsenic and some heavy metals from contaminated water", Radiation Physics and Chemistry, Oct. 2012, vol. 81, No. 10, pp. 1606-1611.

Croll, "Formation of Tectocapsules by Assembly and Cross-linking of Poly(divinylbenzene-alt-maleic anhydride) Spheres at the Oil-Water Interface", Langmuir, May 2003, vol. 19, No. 14, pp. 5918-5922, XP055355244.

Gorka, "KOH activation of mesoporous carbons obtained by soft-templating", Carbon, Jul. 2008, vol. 46, No. 8, pp. 1159-1161.

Harada, "Removal of primary and secondary amines by reaction gas chromatography using porous maleic anhydride-divinylbenzene copolymer beads", Pharmaceutical Science Department, Kumamoto University, Jul. 1982, vol. 31, pp. 697-701.

Kaliva, "Microporous Polystyrene Particles for Selective Carbon Dioxide Capture", Langmuir, Feb. 2012, vol. 28, No. 5, pp. 2690-2695.

Niu, "Highly dispersed Ru on K-doped meso-macroporous $SiO_2$ for the preferential oxidation of CO in $H_2$-rich gases", International Journal of Hydrogen Energy, 2014, vol. 39, No. 25, pp. 13800-13807.

Ogawa, "Preparation of Spherical Polymer Beads of Maleic Anhydride-Styrene-Divinylbenzene and Metal Sorption of its Derivatives", Journal of Applied Polymer Science, 1984, vol. 29, No. 9, pp. 2851-2856.

Okay, "Porous Maleic Anhydride-Styrene-Divinylbenzene Copolymer Beads", Journal of Applied Polymer Science, Jul. 1987, vol. 34, pp. 307-317, XP055356037.

Song, "Coordination of Metal Cations with Amino-Functionalized MCM-41 for Adsorptive Desulfurization", Advanced Materials Research, 2014, vols. 926-930, pp. 4222-4225.

Woodward, "Swellable, Water- and Acid-Tolerant Polymer Sponges for Chemoselective Carbon Dioxide Capture", Journal of the American Chemical Society, 2014, vol. 136, No. 25, pp. 9028-9035.

Yan, "In situ growth of a carbon interphase between carbon fibres and a polycarbosilane-derived silicon carbide matrix", Carbon, 2011, vol. 49, No. 8, pp. 2869-2877.

Yang, "A Pervaporation Study of Ammonia Solutions Using Molecular Sieve Silica Membranes", Membranes, 2014, vol. 4, No. 1, pp. 40-54.

Yim, "Removal of Formaldehyde Over Amine Functionalized SBA-15", Journal of Nanoscience and Nanotechnology, 2011, vol. 11, No. 2, pp. 1714-1717.

International Search Report for PCT International Application No. PCT/IB2018/054312, dated Sep. 12, 2018, 4 pages.

\* cited by examiner

POLYMERIC SORBENTS FOR ALDEHYDES

CROSS REFERENCE TO RELATED APPLICATIONS

This application is a national stage filing under 35 U.S.C. 371 of PCT/IB2048/054312, filed Jun. 13, 2018, which claims the benefit of U.S. Provisional Patent Application No. 62/520,792, filed Jun. 16, 2017, the disclosure of which is incorporated by reference herein in its entirety.

TECHNICAL FIELD

Polymeric sorbents for aldehydes, methods of sorbing aldehydes on the polymeric sorbents, composite granules that include the polymeric sorbent, and compositions resulting from the sorption of aldehydes on the polymeric sorbents are provided.

BACKGROUND

Formaldehyde is a known carcinogen and allergen. For this reason, the Occupational Safety and Health Administration (OSHA) in the United States has set an eight-hour exposure limit of 0.75 parts per million and a 15-minute exposure limit of 2 parts per million for formaldehyde vapor. Despite its toxicity, formaldehyde is a high volume industrial compound. It is used, for example, to prepare polymeric materials that find widespread use in various building materials including foam insulation, particle board, carpet, paint, and varnish. Out-gassing of residual formaldehyde from these building materials makes formaldehyde one of the most prevalent indoor air pollutants. Formaldehyde is also a by-product of the combustion of organic materials. Thus, formaldehyde is a common outdoor pollutant as well arising from automobile exhaust, methane combustion, forest fires, and cigarette smoke.

While in North America strict formaldehyde out-gassing limitations are placed on building materials, this is not the case in all parts of the world. In some Asian countries, for example, few restrictions are placed on building materials. Combined with an increased use of biofuels to heat homes and to run automobiles, dangerous levels of formaldehyde vapor may occur in both indoor and outdoor air. For this reason, there is an immediate need for solutions to mitigate human exposure to formaldehyde vapor both as an indoor and an outdoor air pollutant.

The high volatility of formaldehyde (it is a gas at room temperature) makes it extremely difficult to capture by the mechanism of physisorption alone. However, because formaldehyde is reactive, it can be more readily captured through chemisorption. With chemisorption, the formaldehyde vapors are captured by chemically reacting with the sorbent itself or with chemicals impregnated in the sorbent. Thus, the key to making high capacity sorbents for formaldehyde is to provide a sorbent with many reactive sites for formaldehyde.

One typical sorbent material that has been used for capturing formaldehyde is based on activated carbon scaffolds. The scaffold of activated carbon, however, is relatively inactive and this inactivity makes it difficult to incorporate a high density of reactive groups into the activated carbon scaffold itself. For this reason, most of the efforts in making sorbents for formaldehyde have been focused on finding impregnation chemistries that can react with formaldehyde. Thus, the activated carbon scaffolds are typically impregnated with various chemistries that react with formaldehyde. The two most common impregnation chemistries used for formaldehyde capture are the sodium salt of sulfamic acid and ethylene urea co-impregnated with phosphoric acid. Various other metal salts have also been used.

Impregnation in general has some drawbacks for making sorbents. First, impregnation chemistries can migrate and this is problematic especially if other sorbents are used in the same product. Another disadvantage to impregnation is that it removes activated carbon's capacity for adsorbing volatile organic compounds (VOCs). The impregnation chemistry occupies the pores of the activated carbon thus reducing the surface area available to capture non-reactive vapors that are captured by physisorption only.

SUMMARY

Polymeric sorbents for aldehydes including formaldehyde are provided. More particularly, the polymeric sorbents are ionic polymeric materials having ionically bonded nitrogen-containing groups. The polymeric sorbents have primary and/or secondary amino groups that can react with an aldehyde. Additionally, granule composites containing the polymeric sorbents, methods of sorbing aldehydes (i.e., aldehydes that are volatile under use conditions) on the polymeric sorbents, and compositions resulting from the sorption of aldehydes on the polymeric sorbents are provided.

In a first aspect, a polymeric sorbent is provided. The polymeric sorbent is a reaction product of a) a hydrolyzed divinylbenzene/maleic anhydride polymeric material having carboxylic acid groups and b) a nitrogen-containing compound having at least two amino groups of formula —NHR, wherein R is hydrogen or alkyl and wherein the nitrogen-containing compound is attached to the hydrolyzed divinylbenzene/maleic anhydride polymeric material with an ionic bond.

In a second aspect, a method of sorbing an aldehyde on a polymeric sorbent is provided. The method includes providing a polymeric sorbent as described above and then sorbing the aldehyde on the polymeric sorbent. The aldehyde is of Formula (I)

$$R_2\text{—(CO)—H} \tag{I}$$

where $R_2$ is hydrogen, alkyl, vinyl, or aryl. The molecular weight of the aldehyde of Formula (I) is typically no greater than 200 grams/mole.

In a third aspect, a composition is provided that includes (a) a polymeric sorbent as described above and (b) an aldehyde sorbed on the polymeric sorbent. The aldehyde is of Formula (I)

$$R_2\text{—(CO)—H} \tag{I}$$

where $R_2$ is hydrogen, alkyl, vinyl, or aryl. The molecular weight of the aldehyde of Formula (I) is typically no greater than 200 grams/mole.

In a fourth aspect, a method of preparing a polymeric sorbent is provided. The method includes providing a divinylbenzene/maleic anhydride precursor polymeric material. The method further includes hydrolyzing the divinylbenzene/maleic anhydride precursor polymeric material to form a hydrolyzed divinylbenzene/maleic anhydride polymeric material having carboxylic acid groups (—COOH groups). The method still further includes reacting the hydrolyzed divinylbenzene/maleic anhydride polymeric material with a nitrogen-containing compound having at least two amino groups of formula —NHR where R is hydrogen or alkyl. The reaction results in the formation of the polymeric sorbent having ionically attached nitrogen-containing groups.

In a fifth aspect, composite granules are provided that includes (a) a polymeric sorbent as described above and (b) a binder.

In a sixth aspect, a method of making composite granules is provided that includes preparing a polymeric sorbent as described above. The method further includes blending the polymeric sorbent with a binder to form a blended material and preparing the composite granules from the blended material.

In a seventh aspect, a method of sorbing (i.e., capturing) an aldehyde on composite granules is provided. The method includes providing composite granules, as described above, that contain a polymeric sorbent and a binder. The method further includes exposing the composite granules to an aldehyde and sorbing the aldehyde on the polymeric sorbent. The aldehyde is of Formula (I)

$$R_2\text{—(CO)—H} \tag{I}$$

wherein $R_2$ is hydrogen, alkyl, vinyl, or aryl. The molecular weight of the aldehyde of Formula (I) is no greater than 200 grams/mole.

DETAILED DESCRIPTION

Polymeric sorbents are provided. Additionally, methods of making the polymeric sorbents, methods of sorbing aldehydes on the polymeric sorbents, compositions resulting from sorption of aldehydes on the polymeric sorbents, composite granules containing the polymeric sorbents, methods of making the composite granules, and methods of sorbing aldehydes on the composite granules are provided. The polymeric sorbents typically are porous, with the pores often being in the size range of mesopores and/or micropores.

More particularly, the polymeric sorbents are a reaction product of a hydrolyzed divinylbenzene/maleic anhydride polymeric material having carboxylic acid groups (—COOH groups) with a nitrogen-containing compound having two primary and/or secondary amino groups. The nitrogen-containing compound has a first primary and/or secondary amino group that is ionically attached to the hydrolyzed divinylbenzene/maleic anhydride polymeric material in the polymeric sorbent. Further, the nitrogen-containing compound has at least one second primary amino group and/or secondary amino group that can react with an aldehyde.

The polymeric sorbent can be used to sorb aldehydes that are volatile at room temperature or under use conditions. Suitable aldehydes are typically of Formula (I)

$$R_2\text{—(CO)—H} \tag{I}$$

where $R_2$ is hydrogen, alkyl, vinyl, or aryl. The molecular weight of the aldehyde of Formula (I) is typically no greater than 200 grams/mole. In some embodiments, the aldehyde is formaldehyde ($R_2$ is hydrogen) or acetaldehyde ($R_2$ is methyl).

The terms "a", "an", and "the" are used interchangeably with "at least one" to mean one or more of the elements being described.

The term "and/or" means either or both. For example, "A and/or B" means only A, only B, or both A and B.

The term "alkyl" refers to a monovalent radical of an alkane, which is a saturated hydrocarbon. The alkyl can have at least 1 carbon atom, at least 2 carbon atoms, or at least 3 carbon atoms and can have up to 20 carbon atoms, up to 18 carbon atoms, up to 16 carbon atoms, up to 12 carbon atoms, up to 10 carbon atoms, up to 6 carbon atoms, or up to 4 carbon atoms.

The term "(hetero)alkylene" refers to a heteroalkylene and/or alkylene.

The term "alkylene" refers to a divalent radical of an alkane. The alkylene can have at least 1 carbon atom, at least 2 carbon atoms, or at least 3 carbon atoms and can have up to 20 carbon atoms, up to 18 carbon atoms, up to 16 carbon atoms, up to 12 carbon atoms, up to 10 carbon atoms, up to 6 carbon atoms, or up to 4 carbon atoms.

The term "heteroalkylene" refers to a divalent radical of a heteroalkane. The heteroalkylene has one or more groups of formula —$R_b$—O—$R_b$— or —$R_b$—NH—$R_b$— where $R_b$ is an alkylene as defined above. Each $R_b$ often has 1 to 10 carbon atoms, 1 to 6 carbon atoms, 1 to 4 carbon atoms, 1 to 3 carbon atoms, or 1 to 2 carbon atoms.

The term "(hetero)aryl" refers to a heteroaryl and/or an aryl.

The term "aryl" refers to a monovalent radical of a carbocyclic aromatic ring compound. The aryl can have at least 5 carbon atoms or at least 6 carbon atoms and can have up to 20 carbon atoms, up to 18 carbon atoms, up to 16 carbon atoms, up to 12 carbon atoms, or up to 10 carbon atoms. The aryl can have more than one or more carbocyclic aromatic rings. Multiple carbocyclic aromatic rings can be bonded by a single bond or fused together.

The term "heteroaryl" refers to a monovalent radical of a heterocyclic aromatic ring compound. The heteroaryl contains one or more heteroatoms selected from nitrogen, oxygen, and sulfur. The heteroaryl can have at least 2 carbon atoms, at least 3 carbon atoms, at least 4 carbon atoms, or at least 5 carbon atoms and can have at least 1 heteroatoms, at least 2 heteroatoms, or at least 3 heteroatoms. The heteroaryl often has 2 to 10 carbon atoms and 1 to 5 heteroatoms, 2 to 6 carbon atoms and 1 to 3 heteroatoms, or 2 to 4 carbon atoms and 1 to 3 heteroatoms. The heteroaryl can have one or more heteroaromatic rings. The one or more heteroaromatic rings can be fused to or connected with a single bond to another aromatic ring that is carbocyclic or heterocyclic.

The term "(hetero)arylene" refers to a heteroarylene and/or an arylene.

The term "arylene" refers to a divalent radical of a carbocyclic aromatic ring compound. The arylene can have at least 5 carbon atoms or at least 6 carbon atoms and can have up to 20 carbon atoms, up to 18 carbon atoms, up to 16 carbon atoms, up to 12 carbon atoms, or up to 10 carbon atoms. The carbocyclic arylene can have more than one or more carbocyclic aromatic rings. Multiple carbocyclic aromatic rings can be bonded by a single bond or fused together.

The term "heteroarylene" refers to a divalent radical of a heterocyclic aromatic ring compound. The heteroarylene contains one or more heteroatoms selected from nitrogen, oxygen, and sulfur. The heteroarylene can have at least 2 carbon atoms, at least 3 carbon atoms, at least 4 carbon atoms, or at least 5 carbon atoms and can have at least 1 heteroatoms, at least 2 heteroatoms, or at least 3 heteroatoms. The heteroarylene often has 2 to 10 carbon atoms and 1 to 5 heteroatoms, 2 to 6 carbon atoms and 1 to 3 heteroatoms, or 2 to 4 carbon atoms and 1 to 3 heteroatoms. The heteroarylene can have one or more heteroaromatic rings. The one or more heteroaromatic rings can be fused to or connected with a single bond to another aromatic ring that is carbocyclic or heterocyclic.

The term "(hetero)aralkylene" refers to a heteroaralkylene and/or aralkylene.

The term "aralkylene" refers to a divalent group that is alkylene substituted by an aryl group, an arylene substituted with an alkyl group, or an arylene bonded to an alkylene group. The aryl, arylene, and alkyl groups are the same as defined above.

The term "heteroaralkylene" refers to a divalent group that is an alkylene substituted by a heteroaryl, a heteroarylene substituted with an alkyl group, or a heteroarylene bonded to an alkylene group. The heteroaryl, heteroarylene, and alkyl groups are the same as defined above.

The term "vinyl" refers to a group of formula $CHR_8=CR_8$— where each $R_8$ independently is hydrogen or alkyl (e.g., methyl).

The term "primary amino group" refers to a group of formula —NHR where R is equal to hydrogen and the term "secondary amino group" refers to a group of formula —NHR where R is equal to alkyl.

The terms "polymer" and "polymeric material" are used interchangeably and refer to materials formed by reacting one or more monomers. These terms include homopolymers, copolymers, terpolymers, or the like. Likewise, the terms "polymerize" and "polymerizing" refer to the process of making a polymeric material that can be a homopolymer, copolymer, terpolymer, or the like.

The term "porous" when referring to a polymeric material means that the polymeric material has pores and can sorb gaseous substances such as, for example, aldehydes. In most embodiments, the polymeric sorbent is porous. Porous materials such as the polymeric sorbents can be characterized based on the size of their pores. The term "micropores" refers to pores having a diameter less than 2 nanometers. The term "mesopores" refers to pores having a diameter in a range of 2 to 50 nanometers. The term "macropores" refers to pores having a diameter greater than 50 nanometers. The porosity of a polymeric material can be characterized from an adsorption isotherm of an inert gas such as nitrogen or argon by the polymeric material under cryogenic conditions (e.g., liquid nitrogen at 77 K). The adsorption isotherm is typically obtained by measuring adsorption of the inert gas such as nitrogen or argon by the polymeric material at multiple relative pressures)($p/p°$ in a range of about $10^{-6}$ to about 0.98±0.01. The isotherms are then analyzed using various methods such as the BET (Brunauer-Emmett-Teller) method to calculate specific surface area and the Density Functional Theory (DFT) to characterize the porosity and the pore size distribution.

The term "sorbing" and similar words such as "sorb", "sorbed", and "sorption" refer to the addition of a first substance (e.g., a gas such as an aldehyde) to a second substance (e.g., a polymeric material such as the polymeric sorbent) by adsorbing, absorbing, or both. Likewise, the term "sorbent" refers to a second substance that sorbs a first substance by adsorbing, absorbing, or both.

The term "surface area" refers to the total area of a surface of a material including the internal surfaces of accessible pores. The surface area is typically calculated from adsorption isotherms obtained by measuring the amount of an inert gas such as nitrogen or argon that adsorbs on the surface of a material under cryogenic conditions (e.g., liquid nitrogen at 77 K) over a range of relative pressures. The term "BET specific surface area" is the surface area per gram of a material (typically, $m^2$/gram) that is usually calculated from adsorption isotherm data of the inert gas over a relative pressure range of 0.05 to 0.30 using the BET method.

The term "polymerizable composition" includes all materials included in the reaction mixture used to form the polymeric material. The polymerizable composition includes, for example, the monomer mixture, the organic solvent, the initiator, and other optional components. Some of the components in the polymerizable composition such as the organic solvent may not undergo a chemical reaction but can influence the chemical reaction and the resulting polymeric material.

The term "monomer mixture" refers to that portion of a polymerizable composition that includes the monomers. More specifically, as used herein, the monomer mixture includes at least divinylbenzene and maleic anhydride.

The terms "divinylbenzene/maleic anhydride polymeric material" and "divinylbenzene/maleic anhydride precursor polymeric material" and "precursor polymeric material" and "precursor polymer" are used interchangeably and refer to a polymeric material prepared from divinylbenzene, maleic anhydride, and optionally a styrene-type monomer. This polymeric material is the precursor to the hydrolyzed divinylbenzene/maleic anhydride polymeric material.

The term "hydrolyzed divinylbenzene/maleic anhydride polymeric material" and "hydrolyzed polymeric material" and "hydrolyzed polymer" are used interchangeably and refer to a polymeric material formed by treating a divinylbenzene/maleic anhydride precursor polymeric material with a hydrolyzing agent and optionally an acid such that the hydrolyzed divinylbenzene/maleic anhydride polymeric material has carboxylic acid groups (—COOH). The carboxylic acid groups can form an ionic bond with a nitrogen-containing compound having primary and/or secondary amino groups.

The term "styrene-type monomer" refers to styrene, an alkyl-substituted styrene (e.g., ethyl styrene), or mixtures thereof. These monomers are often present in divinylbenzene as impurities.

The term "room temperature" refers to a temperature in a range of 20° C. to 30° C., in a range of 20° C. to 25° C., in a range close to and including 25° C., or 25° C.

In one aspect, a polymeric sorbent is provided. In another aspect, a method of preparing a polymeric sorbent is provided. The polymeric sorbent is formed by reacting a hydrolyzed divinylbenzene/maleic anhydride polymeric material having carboxylic acid groups and a nitrogen-containing compound having at least two amino groups of formula —NHR where R is hydrogen or alkyl.

One of the at least two amino groups forms an ionic bond with carboxylic acid groups in the hydrolyzed divinylbenzene/maleic anhydride polymeric material. That is, the nitrogen-containing compound becomes part of the polymeric sorbent.

The hydrolyzed divinylbenzene/maleic anhydride polymeric material is formed from a divinylbenzene/maleic anhydride precursor polymeric material. The conditions used to synthesize the precursor polymeric material are typically selected so that this material has a BET specific surface area equal to at least 100 $m^2$/gram.

The precursor polymeric material (i.e., the divinylbenzene/maleic anhydride precursor polymeric material) is typically synthesized from a polymerizable composition that includes a monomer mixture containing maleic anhydride, divinylbenzene, and an optional styrene-type monomer. The precursor polymeric material is usually formed from a monomer mixture containing 1) 8 to 65 weight percent maleic anhydride, 2) 30 to 85 weight percent divinylbenzene, and 3) 0 to 40 weight percent of a styrene-type monomer, wherein the styrene-type monomer is styrene, an alkyl-substituted styrene, or a combination thereof. The amounts are based on the total weight of monomers in the monomer mixture, which is equal to the total weight of monomers in the polymerizable composition. When the precursor polymeric material is used to form a polymeric sorbent that is particularly effective for sorption of aldehydes, the monomer mixture often contains 1) 15 to 65 weight percent maleic anhydride, 2) 30 to 85 weight percent divinylbenzene, and 3) 0 to 40 weight percent of a styrene-type monomer, wherein the styrene-type monomer is styrene, an alkyl-substituted styrene, or a combination thereof. The maleic anhydride that is included in the monomer mixture results in the formation of maleic anhydride monomeric units of Formula (II) within the precursor polymeric material.

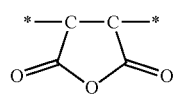

(II)

The asterisks in this formula and other formulas contained herein denote the location of attachment of the monomeric unit to another monomeric unit or to a terminal group.

The amount of maleic anhydride used to form the precursor polymeric material influences the amount of nitrogen-containing compound that can react with the precursor polymeric material to form the polymeric sorbent. The nitrogen-containing compound reacts with the anhydride group to become ionically attached to the polymeric material that is the polymeric sorbent.

In some embodiments, the amount of maleic anhydride included in the monomer mixture is at least 8 weight percent, at least 10 weight percent, at least 12 weight percent, at least 15 weight percent, or at least 20 weight percent. The amount of maleic anhydride can be up to 65 weight percent, up to 60 weight percent, up to 55 weight percent, up to 50 weight percent, up to 45 weight percent, up to 40 weight percent, up to 35 weight percent, up to 30 weight percent, or up to 25 weight percent. For example, the maleic anhydride may be present in a range of 8 to 65 weight percent, 15 to 65 weight percent, 15 to 60 weight percent, 15 to 50 weight percent, 15 to 40 weight percent, 20 to 65 weight percent, 20 to 60 weight percent, 20 to 50 weight percent, 20 to 40 weight percent, 30 to 65 weight percent, 30 to 60 weight percent, 30 to 50 weight percent, 40 to 65 weight percent, or 40 to 60 weight percent. The amounts are based on the total weight of monomers in the monomer mixture contained in the polymerizable composition used to form the precursor polymeric material.

Stated differently, the precursor polymeric material contains monomeric units of Formula (II) in a range of 8 to 65 weight percent, 15 to 65 weight percent, 15 to 60 weight percent, 15 to 50 weight percent, 15 to 40 weight percent, 20 to 65 weight percent, 20 to 60 weight percent, 20 to 50 weight percent, 20 to 40 weight percent, 30 to 65 weight percent, 30 to 60 weight percent, 30 to 50 weight percent, 40 to 65 weight percent, or 40 to 60 weight percent. These amounts are based on the total weight of the monomeric units in the precursor polymeric material.

The divinylbenzene included in the monomer mixture results in the formation of divinylbenzene monomeric units of Formula (III) within the precursor polymeric material.

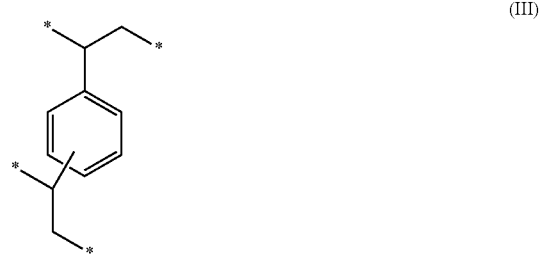

(III)

The two groups attached to the benzene ring can be in an ortho, meta, or para arrangement to each other. The monomeric units of Formula (III) contribute to the high crosslink density and to the formation of a rigid polymeric material having micropores and/or mesopores.

The amount of divinylbenzene used to form the precursor polymeric material can have a strong influence on the BET specific surface area of both the precursor polymeric material and the polymeric sorbent. The BET specific surface area tends to increase with an increase in the amount of divinylbenzene in the monomer mixture used to form the precursor polymeric material and with the resulting amount of monomeric units of Formula (III) in the polymeric sorbent. If the amount of divinylbenzene is less than 30 weight percent, the polymeric sorbent may not have a sufficiently high BET specific surface area. On the other hand, if the amount of divinylbenzene is greater than 85 weight percent, the amount of aldehyde sorbed may be compromised because there are fewer nitrogen-containing groups in the polymeric sorbent. In some embodiments, the amount of divinylbenzene included in the monomer mixture is at least 30 weight percent, at least 35 weight percent, at least 40 weight percent, or at least 45 weight percent. The amount of divinylbenzene can be up to 85 weight percent, up to 80 weight percent, up to 75 weight percent, up to 70 weight percent, up to 65 weight percent, up to 60 weight percent, or up to 50 weight percent. For example, the amount can be in a range of 30 to 85 weight percent, 30 to 80 weight percent, 30 to 75 weight percent, 30 to 70 weight percent, 30 to 65 weight percent, 30 to 60 weight percent, 30 to 55 weight percent, 30 to 50 weight percent, 35 to 80 weight percent, 35 to 70 weight percent, 35 to 60 weight percent, 40 to 85 weight percent, 40 to 80 weight percent, 40 to 70 weight percent, or 40 to 60 weight percent. The amounts are based on the total weight of monomers in the monomer mixture contained in the polymerizable composition used to form the precursor polymeric material.

Stated differently, the precursor polymeric material contains monomeric units of Formula (III) in a range of 30 to 85 weight percent, 30 to 80 weight percent, 30 to 75 weight percent, 30 to 70 weight percent, 30 to 65 weight percent, 30 to 60 weight percent, 30 to 55 weight percent, 30 to 50 weight percent, 35 to 80 weight percent, 35 to 70 weight percent, 35 to 60 weight percent, 40 to 85 weight percent, 40 to 80 weight percent, 40 to 70 weight percent, or 40 to 60 weight percent. These amounts are based on the total weight of the monomeric units in the precursor polymeric material.

Divinylbenzene can be difficult to obtain in a pure form. For example, divinylbenzene is often commercially available with purity as low as 55 weight percent. Obtaining divinylbenzene with purity greater than about 80 weight percent can be difficult and/or expensive. The impurities accompanying divinylbenzene are typically styrene-type monomers such as styrene, alkyl-substituted styrene (e.g., ethyl styrene), or mixtures thereof. Thus, styrene-type monomers are often present along with divinylbenzene and maleic anhydride in the monomer mixture contained in the polymerizable composition used to form the precursor polymeric material. The monomer mixture typically contains 0 to 40 weight percent styrene-type monomers based on the total weight of monomers in the monomer mixture. If the content of the styrene-type monomer is greater than 40 weight percent, the crosslink density may be too low and/or the distance between crosslinks may be too large to provide a divinylbenzene/maleic anhydride precursor polymeric material having a BET specific surface area equal to at least 100 $m^2$/gram. As the crosslink density decreases, the polymeric sorbent tends to be less rigid and less porous. Typically, divinylbenzene having a purity of 55 weight percent is not suitable for use in the monomer mixtures used to form the precursor polymeric material because the content of styrene-type monomer impurities is too high. If the monomer mixture contains too much styrene-type monomer, the amount of divinylbenzene may be undesirably low. Using divinylbenzene having a lower purity than about 80 weight percent can result in the formation of a precursor polymeric material and/or a polymeric sorbent with an undesirably low BET specific surface area.

The styrene-type monomers included in the monomer mixture result in the presence of styrene-type monomeric units of Formula (IV) within the precursor polymeric material.

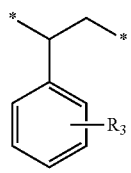

(IV)

Group $R_3$ is hydrogen or alkyl (e.g., an alkyl having 1 to 10 carbon atoms, 1 to 6 carbon atoms or 1 to 4 carbon atoms).

In some embodiments, the amount of styrene-type monomers used to form the precursor polymeric material, is at least 1 weight percent, at least 2 weight percent, or at least 5 weight percent. The amount of styrene-type monomers can be up to 40 weight percent, up to 30 weight percent, up to 20 weight percent, or up to 10 weight percent. For example, the amount can be in a range of 0 to 40 weight percent, 1 to 40 weight percent, 5 to 40 weight percent, 10 to 40 weight percent, 0 to 30 weight percent, 1 to 30 weight percent, 5 to 30 weight percent, 10 to 30 weight percent, 0 to 20 weight percent, 1 to 20 weight percent, 5 to 20 weight percent, or 10 to 20 weight percent. The amounts are based on the total weight of monomers in the monomer mixture contained in the polymerizable composition used to form the precursor polymeric material.

Stated differently, the precursor polymeric material contains monomeric units of Formula (IV) in a range of 0 to 40 weight percent, 1 to 40 weight percent, 5 to 40 weight percent, 10 to 40 weight percent, 0 to 30 weight percent, 1 to 30 weight percent, 5 to 30 weight percent, 10 to 30 weight percent, 0 to 20 weight percent, 1 to 20 weight percent, 5 to 20 weight percent, or 10 to 20 weight percent. These amounts are based on the total weight of the monomeric units in the precursor polymeric material.

Overall, the precursor polymeric material is formed from a polymerizable composition containing a monomer mixture that includes 8 to 65 weight percent maleic anhydride, 30 to 85 weight percent divinylbenzene, and 0 to 40 weight percent of a styrene-type monomer. In some embodiments, the monomer mixture contains 15 to 65 weight percent maleic anhydride, 30 to 85 weight percent divinylbenzene, and 0 to 40 weight percent (or 5 to 40 weight percent) of a styrene-type monomer. Some embodiments contain 25 to 65 weight percent maleic anhydride, 30 to 75 weight percent divinylbenzene, and 1 to 20 weight percent (or 5 to 20 weight percent) styrene-type monomer. Some embodiments contain 25 to 60 weight percent maleic anhydride, 30 to 75 weight percent divinylbenzene, and 1 to 30 weight percent (or 5 to 30 weight percent or 10 to 30 weight percent) styrene-type monomer. In still other embodiments, the monomer mixture contains 30 to 65 weight percent maleic anhydride, 30 to 70 weight percent divinylbenzene, and 1 to 20 weight percent (or 5 to 20 weight percent or 10 to 20 weight percent) styrene-type monomer. In still other embodiments, the monomer mixture contains 30 to 60 weight percent maleic anhydride, 30 to 65 weight percent divinylbenzene, and 1 to 20 weight percent (or 5 to 20 weight percent or 10 to 20 weight percent) styrene-type monomer. In further embodiments, the monomer mixture contains 40 to 60 weight percent maleic anhydride, 30 to 55 weight percent divinylbenzene, and 1 to 20 weight percent (or 5 to 20 weight percent, or 10 to 20 weight percent) styrene-type monomers. In still further embodiments, the monomer mixture contains 20 to 40 weight percent maleic anhydride, 50 to 70 weight percent divinylbenzene, and 1 to 20 weight percent (or 5 to 20 weight percent or 10 to 20 weight percent) styrene-type monomer. The weight percent values are based on the total weight of monomers in the monomer mixture used to form the precursor polymeric material.

The monomer mixture included in the polymerizable composition used to form the precursor polymeric material typically contains at least 95 weight percent monomers selected from maleic anhydride, divinylbenzene, and styrene-type monomer. For example, at least 97 weight percent, at least 98 weight percent, at least 99 weight percent, at least 99.5 weight percent, at least 99.9 weight percent, or 100 weight percent of the monomers in the monomer mixture are selected from maleic anhydride, divinylbenzene, and styrene-type monomer. In some embodiments, where high purity divinylbenzene is used, the monomer mixture contains only divinylbenzene and maleic anhydride. That is, the sum of the amount of divinylbenzene and maleic anhydride is 100 weight percent.

In addition to the monomer mixture, the polymerizable composition used to form the precursor polymeric material includes an organic solvent. The polymerizable composition is a single phase prior to polymerization. Stated differently, prior to polymerization, the polymerizable composition is not a suspension. The organic solvent is selected to dissolve the monomers included in the monomer mixture and to solubilize the precursor polymeric material as it begins to form. The organic solvent typically includes a ketone, ester, acetonitrile, or mixture thereof.

The organic solvent can function as a porogen during the formation of the precursor polymeric material. The organic solvent choice can strongly influence the BET specific surface area and the size of the pores formed in the precursor polymeric material. Using organic solvents that are miscible with both the monomers and the forming polymer tends to result in the formation of micropores and mesopores within the precursor polymeric material. Good solvents for the monomers and the forming polymer tend to result in a larger fraction of the porosity of the precursor polymeric material being in the form of micropores and mesopores.

Organic solvents that are particularly suitable for producing precursor polymeric materials with micropores and mesopores include ketones, esters, acetonitrile, and mixtures thereof. The organic solvent can affect the BET specific surface area of the precursor polymeric material. Typically, it is desirable that the precursor polymeric material has a BET surface area equal to at least 100 m$^2$/gram. Provided that the resulting precursor polymeric material has a BET specific surface area equal to at least 100 m$^2$/gram, other organic solvents can be added along with one or more of the organic solvents listed above. Examples of suitable ketones include, but are not limited to, alkyl ketones such as methyl ethyl ketone and methyl isobutyl ketone. Examples of suitable esters include, but are not limited to, acetate esters such as ethyl acetate, propyl acetate, butyl acetate, amyl acetate, and tert-butyl acetate.

The organic solvent can be used in any desired amount. The polymerizable compositions often have percent solids in a range of 1 to 75 weight percent (i.e., the polymerizable composition contains 25 to 99 weight percent organic solvent). If the percent solids is too low, the polymerization time may become undesirably long. The percent solids is often at least 1 weight percent, at least 2 weight percent, at least 5 weight percent, at least 10 weight percent, or at least 15 weight percent. If the weight percent solids is too great, however, the monomers do not form a single phase with the organic solvent. Further, increasing the percent solids tends to result in the formation of precursor polymeric material with a lower BET specific surface area. The percent solids usually can be up to 75 weight percent, up to 70 weight percent, up to 60 weight percent, up to 50 weight percent, up to 40 weight percent, up to 30 weight percent, or up to 25 weight percent. For example, the percent solids can be in a range of 5 to 75 weight percent, 5 to 70 weight percent, 5 to 60 weight percent, 5 to 50 weight percent, 5 to 40 weight percent, 5 to 30 weight percent, or 5 to 25 weight percent.

In addition to the monomer mixture and organic solvent, the polymerizable compositions used to form the precursor polymeric material typically include an initiator for free radical polymerization reactions. Any suitable free radical initiator can be used. Suitable free radical initiators are typically selected to be miscible with the monomers included in the polymerizable composition. In some embodiments, the free radical initiator is a thermal initiator that can be activated at a temperature above room temperature. In other embodiments, the free radical initiator is a redox initiator. Because the polymerization reaction is a free radical reaction, it is desirable to minimize the amount of oxygen in the polymerizable composition.

Both the type and amount of initiator can affect the polymerization rate. In general, increasing the amount of the initiator tends to lower the BET specific surface area; however, if the amount of initiator is too low, it may be difficult to obtain high conversions of the monomers to polymeric material. The free radical initiator is typically present in an amount in a range of 0.05 to 10 weight percent, 0.05 to 8 weight percent, 0.05 to 5 weight percent, 0.1 to 10 weight percent, 0.1 to 8 weight percent, 0.1 to 5 weight percent, 0.5 to 10 weight percent, 0.5 to 8 weight percent, 0.5 to 5 weight percent, 1 to 10 weight percent, 1 to 8 weight percent, or 1 to 5 weight percent. The weight percent is based on the total weight of monomers in the polymerizable composition.

Suitable thermal initiators include organic peroxides and azo compounds. Example azo compounds include, but are not limited to, those commercially available under the trade designation VAZO from E.I. du Pont de Nemours Co. (Wilmington, Del.) such as VAZO 64 (2,2'-azobis(isobutyronitrile)), which is often referred to as AIBN, and VAZO 52 (2,2'-azobis(2,4-dimethylpentanenitrile)). Other azo compounds are commercially available from Wako Chemicals USA, Inc. (Richmond, Va.) such as V-601 (dimethyl 2,2'-azobis(2-methylproprionate)), V-65 (2,2'-azobis(2,4-dimethyl valeronitrile)), and V-59 (2,2'-azobis(2-methylbutyronitrile)). Organic peroxides include, but are not limited to, bis(1-oxoaryl)peroxides such as benzoyl peroxide (BPO), bis(1-oxoalkyl)peroxides such as lauroyl peroxide, and dialkyl peroxides such as dicumyl peroxide or di-tert-butyl peroxide and mixtures thereof. The temperature needed to activate the thermal initiator is often in a range of 25° C. to 160° C., in a range of 30° C. to 150° C., in a range of 40° C. to 150° C., in a range of 50° C. to 150° C., in a range of 50° C. to 120° C., or in a range of 50° C. to 110° C.

Suitable redox initiators include arylsulfinate salts, triarylsulfonium salts, or N,N-dialkylaniline (e.g., N,N-dimethylaniline) in combination with a metal in an oxidized state, a peroxide, or a persulfate. Specific arylsulfinate salts include tetraalkylammonium arylsulfinates such as tetrabutylammonium 4-ethoxycarbonylbenzenesulfinate, tetrabutylammonium 4-trifluoromethylbenzenesulfinate, and tetrabutylammonium 3-trifluoromethylbenzenesulfinate. Specific triarylsulfonium salts include those with a triphenylsulfonium cation and with an anion selected from $PF_6^-$, $AsF_6^-$, and $SbF_6^-$. Suitable metal ions include, for example, ions of group III metals, transition metals, and lanthanide metals. Specific metal ions include, but are not limited to, Fe(III), Co(III), Ag(I), Ag(II), Cu(II), Ce(III), Al (III), Mo(VI), and Zn(II). Suitable peroxides include benzoyl peroxide, lauroyl peroxide, and the like. Suitable persulfates include, for example, ammonium persulfate, tetraalkylammonium persulfate (e.g., tetrabutylammonium persulfate), and the like.

The polymerizable composition is typically free or substantially free of surfactants. As used herein, the term "substantially free" in reference to the surfactant means that no surfactant is purposefully added to the polymerizable composition and any surfactant that may be present is the result of being an impurity in one of the components of the polymerizable composition (e.g., an impurity in the organic solvent or in one of the monomers). The polymerizable composition typically contains less than 0.5 weight percent, less than 0.3 weight percent, less than 0.2 weight percent, less than 0.1 weight percent, less than 0.05 weight percent, or less than 0.01 weight percent surfactant based on the total weight of the polymerizable composition. The absence of a surfactant is advantageous because these materials tend to restrict access to and, in some cases, fill micropores and mesopores in a precursor polymeric material.

When the polymerizable composition is heated in the presence of a free radical initiator, polymerization of the monomers in the monomer mixture occurs. By balancing the amounts of each monomer in the monomer mixture and by selection of an organic solvent that can solubilize all the monomers and the growing polymeric material during its early formation stage, a precursor polymeric material can be prepared that has a BET specific surface area equal to at least 100 m$^2$/gram. The BET specific surface area of the precursor polymeric material can be at least 150 m$^2$/gram, at least 200 m²/gram, or at least 300 m²/gram. The BET specific surface area can be, for example, up to 1000 m²/gram or higher, up to 900 m²/gram, up to 800 m²/gram, up to 750 m²/gram, or up to 700 m²/gram.

The structure of the divinylbenzene/maleic anhydride polymeric material is particularly well suited for use as a precursor polymeric material for the porous polymeric sorbent. Providing that the content of monomeric units of Formula (IV) from styrene-type monomers is low, the divinylbenzene/maleic anhydride precursor polymeric material has alternating monomeric units from divinylbenzene and maleic anhydride. This structure results in high crosslinking and contributes to the formation of a porous polymeric material, particularly a porous polymeric material having a high content of micropores and/or mesopores.

The precursor polymeric material is the reaction product of the polymerizable composition. The precursor polymeric material is usually formed from the polymerizable composition that contains (a) 8 to 65 weight percent of a first monomeric unit of Formula (II),

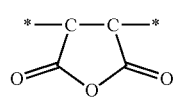
(II)

(b) 30 to 85 weight percent of a second monomeric unit of Formula (III), and

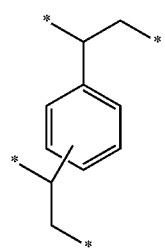
(III)

(c) 0 to 40 weight percent of a third monomeric unit of Formula (IV) wherein $R_3$ is hydrogen or alkyl (e.g., an alkyl having 1 to 10 carbon atoms, 1 to 6 carbon atoms, or 1 to 4 carbon atoms).

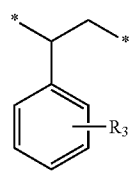
(IV)

In many embodiments, to be particularly effective as a polymeric sorbent for aldehydes, the precursor polymeric material contains (a) 15 to 65 weight percent of a first monomeric unit of Formula (II), (b) 30 to 85 weight percent of a second monomeric unit of Formula (III), and (c) 0 to 40 weight percent (or 5 to 40 weight percent) of a third monomeric unit of Formula (IV). Each weight percent value is based on the total weight of monomeric units in the precursor polymeric material.

Some embodiments of the precursor polymeric material contain 25 to 65 weight percent of the first monomeric unit of Formula (II), 30 to 75 weight percent of the second monomeric unit of Formula (III), and 1 to 20 weight percent (or 5 to 20 weight percent) of the third monomeric unit of Formula (IV). Some embodiments contain 25 to 60 weight percent of the first monomeric unit of Formula (II), 30 to 75 weight percent of the second monomeric unit of Formula (III), and 1 to 30 weight percent (or 5 to 30 weight percent or 10 to 30 weight percent) of the third monomeric unit of Formula (IV). In still other embodiments, the monomer mixture contains 30 to 65 weight percent of the first monomeric unit of Formula (II), 30 to 70 weight percent of the second monomeric unit of Formula (III), and 1 to 20 weight percent (or 5 to 20 weight percent or 10 to 20 weight percent) of the third monomeric unit of Formula (IV). In still other embodiments, the monomer mixture contains 30 to 60 weight percent of the first monomeric unit of Formula (II), 30 to 65 weight percent of the second monomeric unit of Formula (III), and 1 to 20 weight percent (or 5 to 20 weight percent or 10 to 20 weight percent) of the third monomeric unit of Formula (IV). In further embodiments, the monomer mixture contains 40 to 60 weight percent of the first monomeric unit of Formula (II), 30 to 55 weight percent of the second monomeric unit of Formula (III), and 1 to 20 weight percent (or 5 to 20 weight percent, or 10 to 20 weight percent) of the third monomeric unit of Formula (IV). In still further embodiments, the monomer mixture contains 20 to 40 weight percent of the first monomeric unit of Formula (II), 50 to 70 weight percent of the second monomeric unit of Formula (III), and 1 to 20 weight percent (or 5 to 20 weight percent or 10 to 20 weight percent) of the third monomeric unit of Formula (IV). The weight percent values are based on the total weight of monomeric units used in the precursor polymeric material.

The precursor polymeric material is hydrolyzed to form a hydrolyzed divinylbenzene/maleic anhydride polymeric material. Hydrolysis results in the ring opening of the groups of Formula (II) in the precursor polymeric material. That is, the hydrolyzed divinylbenzene/maleic anhydride polymeric material includes one or more of the following types of groups (VII-A, VII-B, and VII-C) depending on the pH conditions and the particular hydrolyzing agent selected.

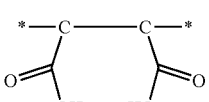
(VII-A)

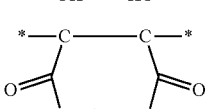
(VII-B)

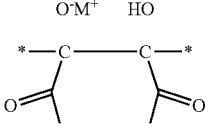
(VII-C)

Groups of Formula (VII-A) have two carboxylic acid groups. Groups of Formula (VII-B) have both a carboxylic acid group and a carboxylate anion. Groups of Formula (VII-C) have two carboxylate anions. In groups of Formulas (VII-B) and (VII-C), $M^+$ can be any suitable cation but is often an alkaline metal cation such as sodium or potassium.

The hydrolysis reaction typically converts at least 70 mole percent, at least 75 mole percent, at least 80 mole percent, at least 85 mole percent, at least 90 mole percent, at least 95 mole percent, at least 97 mole percent, at least 98 mole percent, at least 99 mole percent, or 100 mole percent of the anhydride groups to carboxylic acid and/or carboxylate groups.

The hydrolysis reaction is often performed at room temperature or close to room temperature by mixing the precursor polymeric material with a solution of an alkaline metal hydroxide, alkaline metal carbonate, alkaline metal bicarbonate, or combination thereof. Specific examples include, but are not limited to sodium hydroxide, potassium hydroxide, sodium carbonate, potassium carbonate, sodium carbonate, sodium bicarbonate, or mixtures thereof. The solutions are typically water-based, alcohol-based, or both.

Alternatively, the hydrolysis reaction may occur by simply heating the precursor polymer at an elevated temperature (e.g., 25 to 120° C.) in water.

After hydrolysis, the hydrolyzed product is usually treated with a dilute acid to convert any carboxylate groups to carboxylic acid groups. That is, groups of Formula (VII-B) and/or (VII-C) are usually converted to groups of Formula (VII-A) prior to treatment with the nitrogen-containing compound. That is, the hydrolyzed divinylbenzene/maleic anhydride polymeric material that is reacted with the nitrogen-containing compound has carboxylic acid groups.

The hydrolyzed (e.g., fully hydrolyzed) divinylbenzene/maleic anhydride polymeric material typically has a BET specific surface area equal to at least 50 m²/gram or at least 100 m²/gram. In some embodiments, the BET specific surface area is at least 150 m²/gram, at least 175 m²/gram, at least 200 m²/gram, at least 225 m²/gram, at least 250 m²/gram, or at least 300 m²/gram. The BET specific surface area can be up to 600 m²/gram or higher, up to 500 m²/gram, or up to 400 m²/gram. In some embodiments, the BET specific surface area is in a range of 50 to 600 m²/gram, in a range of 75 to 600 m²/gram, in a range of 100 to 600 m²/gram, or in a range of 200 to 600 m²/gram.

The polymeric sorbent is formed by reacting the hydrolyzed polymeric material having carboxylic acid groups with a nitrogen-containing compound to form an ionic bond. The nitrogen-containing compound, which is usually basic, contains a first primary and/or secondary amino group that reacts with a carboxylic acid group in the hydrolyzed divinylbenzene/maleic anhydride polymeric material. That is, the first amino primary and/or secondary amino group within the nitrogen-containing compound reacts with a carboxylic acid group in the monomeric units of Formula (VII-A) within the hydrolyzed divinylbenzene/maleic anhydride polymeric material. This reaction results in the formation of an ionic bond linking the nitrogen-containing compound to the polymeric material in the polymeric sorbent. The ionically bonded nitrogen-containing compound has at least one second primary and/or secondary amino group that can react with an aldehyde.

The nitrogen-containing compound has two or more groups of formula —NHR where R is hydrogen or alkyl. This compound can have two or more primary amino groups (where R is equal to hydrogen), can have two or more secondary amino groups (where R is equal to an alkyl), or can have at least one primary amino group plus at least one secondary amino group. Suitable alkyl R groups often have 1 to 20 carbon atoms. For example, the alkyl can have at least 1 carbon atom, at least 2 carbon atoms, or at least 4 carbon atoms and can have up to 20 carbon atoms, up to 18 carbon atoms, up to 16 carbon atoms, up to 10 carbon atoms, up to 6 carbon atoms, or up to 4 carbon atoms. In some embodiments, the alkyl has 1 to 10 carbon atoms, 1 to 6 carbon atoms, or 1 to 4 carbon atoms.

Many suitable nitrogen-containing compounds are of Formula (V).

$$R_4NHR_1 \qquad (V)$$

In Formula (V), the group $R_1$ is hydrogen or an alkyl. The group $R_4$ is a group of formula —$R_5$—$NHR_6$ or —(C=NH)—$NH_2$. The group $R_5$ is an alkylene, (hetero)arylene, (hetero)aralkylene, heteroalkylene having one or more oxy (—O—) groups, or heteroalkylene having one or more —NH-groups. (Hetero)arylene and (hetero)aralkylene $R_5$ groups can optionally be substituted with a primary amino group and/or a secondary amino group. The group $R_6$ is hydrogen, alkyl, or —(C=NH)—$NH_2$.

Suitable alkyl groups for $R_1$ in Formula (V) can have at least 1 carbon atom, at least 2 carbon atoms, or at least 4 carbon atoms and can have up to 20 carbon atoms, up to 18 carbon atoms, up to 12 carbon atoms, up to 10 carbon atoms, or up to 6 carbon atoms. In some embodiments, the alkyl has 1 to 10 carbon atoms, 1 to 6 carbon atoms, or 1 to 4 carbon atoms.

In some embodiments, $R_4$ in Formula (V) is a group of formula —$R_5$—$NHR_6$ and the nitrogen-containing compound is of Formula (V-1).

$$R_6HN—R_5—NHR_1 \qquad (V-1)$$

Such compounds have at least two amino groups of formula —HR. Suitable alkyl groups for $R_6$ in Formula (V-1) can have at least 1 carbon atom, at least 2 carbon atoms, or at least 4 carbon atoms and can have up to 20 carbon atoms, up to 18 carbon atoms, up to 12 carbon atoms, up to 10 carbon atoms, or up to 6 carbon atoms. In some embodiments, the alkyl has 1 to 10 carbon atoms, 1 to 6 carbon atoms, or 1 to 4 carbon atoms. The group $R_5$ can be an alkylene, (hetero)arylene, (hetero)aralkylene, heteroalkylene having one or more oxy (—O—) groups, or heteroalkylene having one or more —NH-groups. (Hetero)arylene and (hetero)aralkylene $R_5$ groups can optionally be substituted with a primary amino group and/or a secondary amino group.

Suitable alkylene $R_5$ groups in Formula (V-1) usually have at least 1 carbon atom, at least 2 carbon atoms, at least 3 carbon atoms, or at least 4 carbon atoms and can have up to 20 carbon atoms, up to 16 carbon atoms, up to 12 carbon atoms, up to 10 carbon atoms, or up to 6 carbon atoms. Some nitrogen-containing compounds are of Formula (V-1) with $R_1$ being hydrogen, $R_5$ being an alkylene, and $R_6$ being hydrogen. Examples of such nitrogen-containing compounds are alkylene diamines such as, for example, methylene diamine, ethylene diamine, propylene diamine, and butylene diamine. Nitrogen-containing compounds of Formula (V-1) having both $R_1$ and $R_6$ equal to alkyl include N,N'-dimethylethylene diamine.

In other embodiments of the compounds of Formula (V-1), the group $R_5$ is a heteroalkylene (i.e., a heteroalkylene is a divalent radical of a heteroalkane, which is an alkane having catenary heteroatoms) having at least one catenary —O— or —NH-group. Stated differently, heteroalkylene $R_3$ groups have one or more groups of formula —$R_a$—[O—$R_b$]$_n$— or —$R_a$—[NH—$R_b$]$_n$— where each $R_a$ and each $R_b$ are independently an alkylene and n is an integer in a range 1 to 50, 1 to 40, 1 to 30, 1 to 20, 1 to 10, 1 to 6, or 1 to 4. Suitable $R_a$ and $R_b$ alkylene groups often have 1 to 10 carbon atoms, 1 to 6 carbon atoms, 1 to 4 carbon atoms, or 1 to 3 carbon atoms. The heteroalkylene often has up to 30 carbon atoms and up to 16 heteroatoms, up to 20 carbon atoms and up to 11 heteroatoms, or up to 10 carbon atoms and up to 6 heteroatoms. Such nitrogen-containing compounds can be represented by Formulas (V-2) and (V-3).

$$R_6HN-R_a-[O-R_b]_n-NHR_1 \quad \text{(V-2)}$$

$$R_6HN-R_a-[NH-R_b]_n-NHR_1 \quad \text{(V-3)}$$

Some nitrogen-containing compounds are of Formula (V-2) with $R_1$ being hydrogen, $R_5$ being a heteroalkylene with —O-groups, and $R_6$ being hydrogen. Examples of such nitrogen-containing compounds are poly(alkylene oxide) diamines such as polyethylene glycol diamine and polypropylene glycol diamine. Further nitrogen-containing compounds are of Formula (V-3) with $R_1$ being hydrogen, $R_5$ being a heteroalkylene with —NH-groups, and $R_6$ being hydrogen. Such nitrogen-containing compounds can be, for example, compounds of formula $H_2N-[(CH_2)_xNH]_y-(CH_2)_xNH_2$ where x is an integer in a range of 1 to 4 and y is in a range of 1 to 10. Examples include diethylene triamine, triethylene tetramine, and tetraethylene pentamine.

The $R_5$ group in Formula (V-1) can also be a (hetero)arylene or (hetero)aralkylene group. The (hetero)arylene or (hetero)aralkylene can optionally be substituted with a primary amino group and/or a secondary amino group. Suitable arylene $R_5$ groups often have 6 to 12 carbon atoms and are often phenylene or diphenylene. Suitable heteroarylene $R_5$ groups often have 2 to 10 carbon atoms and 1 to 5 heteroatoms selected from nitrogen, oxygen and sulfur. Suitable (hetero)aralkylene $R_5$ groups often have an alkylene or alkyl portion having 1 to 10 carbon atoms, 1 to 6 carbon atoms, or 1 to 4 carbon atoms. The aryl or arylene portion of the aralkylene often has 6 to 12 carbon atoms and is often either phenyl or phenylene. The heteroaryl or heteroarylene portion of the heteroaralkylene often has 2 to 10 carbon atoms and 1 to 5 heteroatoms selected from nitrogen, oxygen, and sulfur. In many embodiments, the heteroatoms are nitrogen.

Example nitrogen-containing compounds of Formula (V-1) with both $R_1$ and $R_6$ being hydrogen and $R_5$ being arylene include, but are not limited to, phenylene diamine. An example nitrogen-containing compound of Formula (V-1) with both $R^1$ and $R^6$ being hydrogen and $R_5$ being a heteroarylene is melamine (i.e., melamine is an heteroarylene with three nitrogen heteroatoms, wherein the heteroarylene is substituted with a primary amino group).

Yet other nitrogen-containing compounds are of Formula (V-1) with $R_6$ being —(C=NH)—NH$_2$ as shown in Formula (V-4).

$$NH_2-(C=NH)-HN-R_5-NHR_1 \quad \text{(V-4)}$$

Such compounds have at least two amino groups of formula —NHR. In some compounds of Formula (V-4), $R_1$ is hydrogen and $R_5$ is alkylene. One such compound is agmatine. Agmatine can be represented by other resonance structures as well but is considered to be within the scope of both Formula (V-1) and (V-4).

In other embodiments of Formula (V), $R_4$ is a group —(C=NH)—NH$_2$. The resulting compounds are of Formula (V-5).

$$H_2N-(C=NH)-NHR_1 \quad \text{(V-5)}$$

Such compounds have at least two amino groups of formula —NHR. The compound of Formula (V-5) is guanidine when $R_1$ is hydrogen.

Other suitable nitrogen-containing compounds are polyamines having at least three groups of formula —NHR$_1$ where $R_1$ is hydrogen or alkyl. Such compounds can be of Formula (VI).

$$R_7-(NHR_1)_z \quad \text{(VI)}$$

In Formula (VI), $R_1$ is defined as above and the variable z is equal to at least 3 and can be up to 10, up to 8, up to 6, or up to 4. The $R_7$ group is often a z-valent radical of an alkane or a z-valent radical of a heteroalkane. Suitable z-valent radicals of alkanes often have a branching carbon atom with at least three of the four adjacent groups being —CH$_2$—. Suitable z-valent radicals of heteroalkanes often have a branching nitrogen atom with three adjacent carbon atoms (e.g., three adjacent groups that are alkylene or alkyl groups) or a branching carbon atom with at least three of the four adjacent atoms being carbon (e.g., three adjacent groups that are alkylene or alkyl groups). These z-valent radicals of heteroalkanes often include one or more groups of formula —R$_c$—[NH—R$_d$]$_p$— where each R$_c$ and each R$_d$ are independently an alkylene and p is an integer in a range 1 to 50, 1 to 40, 1 to 30, 1 to 20, 1 to 10, 1 to 6, or 1 to 4. Suitable R$_c$ and R$_d$ alkylene groups often have 1 to 10 carbon atoms, 1 to 6 carbon atoms, 1 to 4 carbon atoms, or 1 to 3 carbon atoms. The z-valent radicals of alkanes often have at least 2 carbon atoms, at least 3 carbon atoms, at least 4 carbon atoms, or at least 5 carbon atoms and up to 20 carbon atoms, up to 16 carbon atoms, up to 12 carbon atoms, or up to 8 carbon atoms. The z-valent radicals of heteroalkanes often have up to 30 carbon atoms and up to 16 heteroatoms, up to 20 carbon atoms and up to 11 heteroatoms, or up to 10 carbon atoms and up to 6 heteroatoms.

Specific polyamines of formula $R_7-(NHR_1)_z$ include various polyimines. Some polyimines include one or more branching nitrogen atoms with each nitrogen-branching atom connected to three groups of formula —R$_c$—[NH—R$_d$]$_p$—. The end group of each branched segment is often a group of formula —NHR$_1$ such as —NH$_2$. Examples include various branched polyethyleneimines. Another specific polyamine is 2-(aminomethyl)-2-methyl-1,3-propanediamine where $R_7$ is a trivalent radical of an alkane (i.e., the carbon branching atom is connected to four carbon atoms with three adjacent alkylene groups and one adjacent methyl group), each $R_1$ is hydrogen, and z is equal to 3.

In many embodiments, the nitrogen-containing compounds such as those of Formula (V) (including Formula V-1 to V-5) and Formula (VI) have a molecular weight (or weight average molecular weight) that is no greater than 2000 Daltons (Da). For example, the molecular weight (or weight average molecular weight) is no greater than 1500 Da, no greater than 1000 Da, no greater than 750 Da, no greater than 500 Da, or no greater than 250 Da.

Up to one mole of the nitrogen-containing compound can be added per mole of carboxylic acid present in the hydrolyzed divinylbenzene/maleic anhydride polymeric material. That is, up to 100 mole percent nitrogen-containing compound can react with the hydrolyzed polymeric material based on the total moles of carboxylic acid. In some embodiments, the amount of nitrogen-containing compound added is up to 95 mole percent or higher, up to 90 mole percent, up to 85 mole percent, up to 80 mole percent, up to 70 mole percent, up to 60 mole percent, or up to 50 mole percent based on the total moles of carboxylic acid. The amount of the nitrogen-containing compound can be at least 1 mole percent, at least 2 mole percent, at least 5 mole percent, at least 10 mole percent, at least 20 mole percent, at least 30 mole percent, at least 40 mole percent, at least 50 mole percent, at least 60 mole percent, or at least 80 mole percent based on the total moles of monomeric units of Formula (II) in the precursor polymeric material. In some embodiments, the amount of nitrogen-containing compound is in a range of 1 to 100 mole percent, in a range of 10 to 100 mole percent, in a range of 20 to 100 mole percent, in a range of 30 to 100 mole percent, a range of 40 to 100 mole percent, in a range of 50 to 100 mole percent, in a range of 60 to 100 mole percent, or in a range of 80 to 100 mole percent based on the total moles of carboxylic acid.

To react the nitrogen-containing compound with the hydrolyzed polymeric material resulting in the formation of an ionic bond, the nitrogen-containing compound is often dissolved in water and/or a suitable organic solvent. Suitable organic solvents are those that dissolve but do not react with the nitrogen-containing compound. Exemplary organic solvents include, but are not limited to, alcohols, ethers such as tetrahydrofuran and diethyl ether, and various chlorinated solvents such as methylene chloride and chloroform. The concentration of the nitrogen-containing compound in water and/or organic solvent can be any suitable amount depending on the solubility of the nitrogen-containing compound. In some embodiments, the concentration of the nitrogen-containing compound in water and/or organic solvent is in a range of 1 to 40 weight percent, in a range of 1 to 30 weight percent, in a range of 1 to 20 weight percent, or in a range of 1 to 10 weight percent.

The solution of the nitrogen-containing compound is mixed with the hydrolyzed polymeric material. The reaction can occur at room temperature or can occur by heating the mixture to a temperature above room temperature. For example, the mixture can be heated at temperatures in a range of 30° C. to 120° C. for several hours to several days. In some embodiments, the suspension is heated at 30° C. to 100° C., 40° C. to 90° C., 50° C. to 90° C., or 60° C. to 80° C. for 12 to 24 hours.

The polymeric sorbent typically has a BET specific surface area that is less than that of the precursor polymeric material. The opening of the anhydride group to form the hydrolyzed polymeric material may sufficiently increase the conformational freedom in the backbone resulting in decreased porosity. In addition, hydrogen bonding between the nitrogen-containing groups in the polymeric sorbent could possibly restrict or block access to pores. Because of this decrease, it is often desirable to prepare a precursor polymeric material having the highest possible BET specific surface area, yet having sufficient anhydride groups to react with the nitrogen-containing compound. The BET specific surface area of the polymeric sorbent is typically at least 25 $m^2$/gram.

In some embodiments, the polymeric sorbent further includes an acid-base indicator. The acid-base colorimetric indicator (i.e., a dye (typically an organic dye) that changes color when it undergoes a transition from being in an acidic form to being in a basic form) can be added at the same time as the nitrogen-containing compound or can be added after addition of the nitrogen-containing compound. The acid-base colorimetric indicator is typically selected to have a $pK_b$ that is less than a $pK_b$ of the nitrogen-containing compound. That is, the acid-base colorimetric indicator is selected to change from a first color to a second color when all or a significant portion of the available nitrogen-containing groups on the polymeric sorbent have reacted with an aldehyde. The change in color signals that the capacity of the polymeric sorbent for sorption of an aldehyde has been reached or is close to being reached. As used herein, the term "close to being reached" means that at least 60 percent or more of the capacity has been reached (i.e., a least 60 percent or more of the available sorption sites have been used for sorption of an aldehyde). For example, at least 70 percent, at least 80 percent, at least 90 percent, or at least 95 percent of the sorption sites have been used for sorption of an aldehyde.

Knowing the $pK_b$ of the nitrogen-containing compound, one of skill in the art can readily select an acid-base colorimetric indicator that has a lower $pK_b$ value. In some applications, the difference between the $pK_b$ value of the nitrogen-containing compound and the $pK_b$ of the acid-base colorimetric indicator is at least 1, at least 2, at least 3, or at least 4. The $pK_b$ of the acid-base colorimetric indicator is often in a range of 3 to 10.

Example acid-base colorimetric indicators include, but are not limited to, methyl red, bromoxylenol blue, pararosaniline, chrysoidine, thymol blue, methyl yellow, bromophenyl blue, Congo red, methyl orange, bromocresol green, azolitmin, bromocresol purple, bromothymol blue, phenol red, neutral red, naphtholphthalein, cresol red, phenolphthalein, and thymolphthalein.

The acid-base colorimetric indicators can be added to the polymeric sorbent using any suitable method. In some embodiments, the polymeric sorbent is soaked in a solution of the acid-base colorimetric indicator for at least 10 minutes, at least 20 minutes, at least 30 minutes, at least 1 hour, at least 2 hours, at least 4 hours, or at least 8 hours. The solution of the acid-base colorimetric indicator is often in a concentration range of 5 to 10 milligrams per milliliter. Often, about 0.5 grams of the polymeric sorbent is soaked in about 10 milliliters of the solution.

In another aspect, composite granules that contain a binder and a polymeric sorbent material for capturing aldehydes such as formaldehyde are provided. The polymeric sorbent material is the same as described above.

The polymeric sorbent and/or the precursor of the polymeric sorbent included in the composite granules is often prepared in a pressurized reactor as a single block of polymeric material. This block of polymeric material is then broken up and crushed into fine particles using a rotary hammer mill. Typical mills include a screen to help control the particle size by keeping all crushed particles smaller than the size of the holes in the screen. During the crushing and milling of the polymeric material, a significant amount of fine particles are produced that can be too small for use in some applications such as filtration applications. For example, as much as one third of the polymeric material that is crushed and milled can be too small for use in certain filtration applications. What is considered to be too small can vary depending on the particular application and on the allowable pressure drop.

The fine particles of the polymeric material can be formed into larger particles (i.e., composite granules) by combination with a binder. The composite granules typically have a size that is suitable for use in filtration applications. Thus, formation of the composite granules allows full use of all of the polymeric material formed within the reactor and thereby reduces the overall production costs of the polymeric sorbent.

Furthermore, some processes for making articles (e.g., filtration articles) containing the polymeric sorbents can result in the formation of additional fine particles. For example, making polymeric sorbent loaded webs, loading respirator cartridges, and ultrasonic welding of respirators and respirator cartridges can lead to pulverization of the polymeric sorbent materials resulting in the formation of fine particles. Providing polymeric sorbents in a form that reduces pulverization can be beneficial from a processing perspective. It has been found that combining the polymeric sorbent with a binder can result in the formation of composite granules with improved toughness (e.g., less likely to crumble apart) compared to polymeric sorbent in the absence of a binder. In addition, the composite granules of the present disclosure can be produced without negatively impacting the ability of the polymeric sorbent to sorb aldehyde compounds to such an extent that the composite granules are not useful as sorbents.

The binder included in the composite granules can be an organic material (such as a polymeric material), an inorganic material (such as, for example, a metal silicate salt), or a combination thereof (a compound having an inorganic portion and an organic portion such as, for example, a metal carboxylate salt). In many embodiments, the binder is a salt or a polymeric material such as, for example, a cellulose resin.

In certain embodiments, the binder includes a polyelectrolyte material. Any suitable polyelectrolyte material can be used including those with organic or inorganic counterions. Some suitable polyelectrolyte material is derived from natural polymers or modified natural polymers. Example polyelectrolyte include, but are not limited to, polyamines, polyamides, polyalcohols, polysacharides, polyacrylamides, polyacrylates, humic acids, proteins, polydiallyldimethylammonium salts such as polydiallyldimethylammonium chloride, polyamine-polydiallyldimethylammonium chloride blends, polyquartenary amines, inorganic-polyamine blends, inorganic-polydiallyldimethylammonium chloride blends, cationic starches, cationic polymethylmethacrylates, copolymers of vinylimidazolium methochloride and vinylpyrrolidone, quarternized vinylpyrrolidone/dimethylaminoethyl methacrylate copolymers, polyethyleneimines, and mixtures thereof. In certain embodiments, the polyelectrolyte material includes cationic starches.

In certain embodiments, the binder includes metal hydroxides, metal oxides, metal salts, organometallic compounds, or combinations thereof. Some suitable metal oxide, metal hydroxide, and metal salt binders are derived from aluminum, calcium, magnesium, or iron (including polyaluminum sulfates and polyaluminum chlorides). Other example binders are polyorganozirconates, polyorganoaluminates, polysiloxanes, polysilanes, polysilazanes, polycarbosilanes, polyborosilanes, zirconium dimethacrylate, zirconium tetramethacrylate, zirconium 2-ethylhexanoate, aluminum butoxides, aluminum diisopropoxide ethylacetoacetate, tetramethyldisiloxanes, tristrimethylsilylphosphate, tristrimethylsiloxyboron, and combinations thereof. Some example metal salts are metal carboxylate salts such as metal carboxylate salts having 10 to 20 carbon atoms (e.g., magnesium stearate). Other example inorganic binders are silicate salts (e.g., metal silicates). Example metal silicates include sodium silicate (e.g., sodium metasilicate), potassium silicate, calcium silicate, magnesium silicate, and combinations thereof. In certain embodiments, the silicate is sodium metasilicate.

Other example binders include a thermoplastic polymer. The thermoplastic polymer can be selected, for example, from polyamides (such as nylons), polyolefins (such as polyethylenes, e.g., LDPE, LLDPE, HDPE, polyethylene copolymers with other polyolefins, and polypropylenes), polyvinylchlorides (both plasticized and unplasticized), fluorocarbon resins (such as polytetrafluoroethylene), polystyrenes, acrylic resins (such as polyacrylates and polymethacrylates), styrene copolymers (such as acrylonitrile-butadiene-styrenes and acrylonitrile-styrenes), polycarbonates, polyvinylacetates, ethylene-vinyl acetate copolymers, polyvinyl alcohols, polyoxymethylene, polyformaldehyde, polyacetals, polyesters (such as polyethylene terephthalate), polyether ether ketones, and phenol-formaldehyde resins (such as resols and novolacs), and combinations thereof.

Yet other example binders include a thermoset polymer. For example, the thermoset polymer is selected from polyurethanes, silicones, fluorosilicones, phenolic resins, melamine resins, melamine formaldehyde resins, and urea formaldehyde resins.

Still other example binders include an elastomer. In certain embodiments, the elastomer is selected from natural rubbers, synthetic rubbers (such as styrene-butadiene rubber, polychloroprene (neoprene), nitrile rubber, and butyl rubber), silicones, polyurethanes, alkylated chlorosulfonated polyethylenes, polyolefins, chlorosulfonated polyethylenes, perfluoroelastomers, ethylene-propylene-diene terpolymers, chlorinated polyethylene, fluoroelastomers, and mixtures thereof.

In certain embodiments, the binder includes a naturally occurring polymer. Example naturally occurring polymer can be selected from celluloses, collagens, organic acids, and combinations thereof. For example, the naturally occurring polymer can be a biodegradable polymer. Suitable biodegradable polymers can be selected from polyethyleneglycols, polylactic acids, polyvinylalcohols, cellulosic resins (such as cellulose acetate butyrates, carboxy methyl cellulose, and cellulose ethers such as hydroxypropyl methylcellulose), alginic acid, carrageenans isolated from seaweed, polysaccharides, pectins, xanthans, starches, copolymers of polylactideglycolide, and combinations thereof. In some embodiments, the biodegradable polymer is selected from polyethyleneglycols, polylactic acids, polyvinylalcohols, copolymers of polylactideglycolide, and mixtures thereof.

In certain embodiments, the binder includes an electrically conductive polymer. Example electrically conductive polymers can be selected from doped polyanilines and polythiophenes.

In certain embodiments, the binder includes a gelling material, an absorbent material, or combinations thereof. Example absorbent binder material can be a superabsorbent material such as polyacrylic acids, polyacrylamides, polyalcohols, polyamines, polyethylene oxides, cellulose such as carboxymethyl cellulose, chitins, gelatins, starches, polyvinyl alcohols, polyacrylic acid, polyacrylonitrile, alginic acid, carrageenans isolated from seaweeds, polysaccharides, pectins, xanthans, polydiallyldimethylammonium chloride, polyvinylpyridine, polyvinylbenzyltrimethylammonium salts, polyvinylacetates, polylactic acids, and combinations thereof.

The composite granules often contain binder in an amount of at least 1 weight percent, at least 2 weight percent, at least 5 weight percent, or at least 10 weight percent based on the total weight of the composite granules. In certain embodiments, the binder is present in the composite granules in an amount of up to 30 weight percent, up to 25 weight percent, or up to 20 weight percent, based on the total weight of the composite granules.

The composite granules often contain polymeric sorbent in an amount of at least 70 weight percent, at least 75 weight percent, or at least 80 weight percent, based on the total weight of the composite granules. In certain embodiments, the polymeric sorbent is present in the composite granules in an amount of up to 90 weight percent, up to 95 weight percent, up to 98 weight percent, or up to 99 weight percent, based on the total weight of the composite granules.

In some embodiments, the composite granules contain 1 to 30 weight percent binder and 70 to 99 weight percent polymeric sorbent based on the total weight of the composite granules. For example, the composite granules can contain 5 to 30 weight percent binder and 70 to 95 weight percent polymeric sorbent, 10 to 30 weight percent binder and 70 to 90 weight percent polymeric sorbent, 1 to 25 weight percent binder and 75 to 99 weight percent polymeric sorbent, 5 to 25 weight percent binder and 75 to 95 weight percent polymeric sorbent, 10 to 25 weight percent binder and 75 to 90 weight percent polymeric sorbent, 1 to 20 weight percent binder and 80 to 99 weight percent polymeric sorbent, 5 to 20 weight percent binder and 80 to 95 weight percent polymeric sorbent, or 10 to 20 weight percent binder and 80 to 90 weight percent polymeric sorbent.

The polymeric sorbent and the binder are often blended together without the use of any liquid such as water or an organic solvent. The blended material can then be pressed into a pellet or disk that is subsequently ground or milled and then sieved to obtain composite granules of the desired size (e.g., the composite granules of the desired size are retained on the sieve). Any material that goes through the sieve can be collected and recycled by pressing into additional pellets or disks.

Any suitable pressure can be used to form the pellets or disks. The blended material can optionally be heated during the process of forming the pellets or disks. In some embodiments, the blended material can be heated to a temperature near (but often below) the melting point of the binder. The pressure and temperature are selected to provide pellets or disks that do not crumble (or that undergo minimal crumbling) when broken. The pellets or disks can have any suitable size, such as for example, from 0.5 to 3 centimeters, from 1 to 3 centimeters, or from 2 to 3 centimeters.

The pressure selected for forming the pellets or disks is typically in a range of 6,000 pounds per square inch (psi) to 60,000 psi or even higher. For example, the pressure is often at least 6,000 psi, at least 6,400 psi, at least 6,500 psi, at least 10,000 psi, at least 20,000 psi, or at least 25,000 psi and can be up to 60,000 psi, up to 50,000 psi, up to 40,000 psi, or up to 30,000 psi. The dwell time (the time the force is applied) can vary from a few seconds to several minutes. For example, the dwell time can be in range of 1 seconds to 10 minutes.

The polymeric sorbents offer a distinct advantage over sorbents based on impregnation of a capture agent. The capture agents are typically simply sorbed on the matrix material such as, for example, activated carbon. That is, the capture agents are usually not ionically attached to the matrix material and can migrate. In contrast, the polymeric sorbents described herein have ionically attached nitrogen-containing groups that interact with the aldehyde and that do not migrate.

In another aspect, a method of sorbing an aldehyde on a polymeric sorbent is provided. The method includes providing a polymeric sorbent and then sorbing the aldehyde on the polymeric sorbent. The polymeric sorbent is a reaction product of (a) a hydrolyzed divinylbenzene/maleic anhydride polymeric material having carboxylic acid groups and (b) a nitrogen-containing compound having at least two amino groups of formula —NHR where R is hydrogen or alkyl. Any of the polymeric sorbents described above can be used. If desired, the polymeric sorbent can be part of a composite granule.

The polymeric sorbent sorbs aldehydes. Suitable aldehydes are of Formula (I)

where $R_2$ is hydrogen, alkyl, vinyl, aryl, or aryl substituted with an alkyl. Suitable alkyl groups typically have 1 to 10 carbon atoms, 1 to 6 carbon atoms, 1 to 4 carbon atoms, 1 to 3 carbon atoms, or 1 carbon atom. The aryl group can have up to 12 carbon atoms or up to 6 carbon atoms. The aryl group is often phenyl. The aryl group can be substituted with an alkyl group such as an alkyl group having 1 to 4 carbon atoms or 1 to 3 carbon atoms.

The aldehyde is sorbed by the polymeric sorbent when it is in the form of a vapor. Thus, the molecular weight of the aldehyde is typically no greater than 200 grams/mole, no greater than 150 grams/mole, no greater than 100 grams/mole, no greater than 75 grams/mole, or no greater than 50 grams/mole. Suitable aldehydes include, but are not limited to formaldehyde, acetaldehyde, propionaldehyde, butyraldehyde, pentanal (valeraldehyde), isovaleraldehyde, hexanal, benzaldehyde, 2,5-dimethylbenzaldehyde, 2,4-dimethylbenzaldehyde, 2,3-dimethylbenzaldehyde, tolualdehydes (ortho-tolualdehyde, meta-tolualdehyde, para-tolualdehyde, and mixtures thereof), acrolein and crotonaldehyde.

The aldehyde can be sorbed at room temperature or at any desired temperature such as in a range of −30° C. to 150° C., −30° C. to 100° C., or in a range of −20° C. to 50° C.

In another aspect, a composition is provided that includes the polymeric sorbent and an aldehyde sorbed on the polymeric sorbent. The polymeric sorbent and the aldehyde are the same as described above. The aldehyde can react with any primary amino group or secondary amino group present on the polymeric sorbent.

In some embodiments, the polymeric sorbent is formed using a compound of Formula (V) as the nitrogen-containing compound.

The resulting polymeric sorbent has ionic groups of formula —COO$^-$(NH$_2$R$_1$R$_4$)$^+$. The anion (—COO—) is from the hydrolyzed divinylbenzene/maleic anhydride polymeric material and the cation ((NH$_2$R$_1$R$_4$)$^+$) is from the nitrogen-containing compound. Groups $R_1$ and $R_4$ are the same as defined above.

In some embodiments, the polymeric sorbent is formed using a compound of Formula (V-1) as the nitrogen-containing compound.

The resulting polymeric sorbent can have ionic groups of formula —COO$^-$(NH$_2$R$_6$—R$_5$—NHR$_1$)$^+$, —COO$^-$(NH$_2$R$_1$—R$_5$—NHR$_6$)$^+$, or both. If the terminal $R_1$ of the group of formula —COO$^-$(NH$_2$R$_6$—R$_5$—NHR$_1$)$^+$ is hydrogen, the polymeric sorbent after exposure to the aldehyde R$_2$—(CO)—H can have groups of formula —COO$^-$(NH$_2$R$_6$—R$_5$—NH—CHR$_2$—OH$_2$)$^+$, —COO$^-$(NH$_2$R$_6$—R$_5$—N(CHR$_2$—OH)$_2$)$^+$, —COO$^-$(NH$_2$R$_6$—R$_5$—N=CR$_2$H)$^+$, or a mixture thereof. Likewise, if the terminal $R_6$ of the group of formula —COO$^-$(NH$_2$R$_1$—R$_5$—NHR$_6$)$^+$ is hydrogen, the polymeric sorbent after exposure to the aldehyde R$_2$—(CO)—H can have groups of formula —COO$^-$(NH$_2$R$_1$—R$_5$—NH—CHR$_2$—OH)$^+$, —COO$^-$(NH$_2$R$_1$—R$_5$—N(CHR$_2$—OH)$_2$)$^+$, —COO$^-$(NH$_2$R$_1$—R$_5$—N=R$_2$H)$^+$, or a mixture thereof. If the terminal $R_1$ of the group of formula —COO$^-$(NH$_2$R$_6$—R$_5$—NHR$_1$)$^+$ is alkyl, the polymeric sorbent after exposure to the aldehyde R$_2$—(CO)—H can have groups of formula —COO$^-$(NH$_2$R$_6$—R$_5$—NR$_1$—CHR$_2$—OH)$^+$. Likewise, if the terminal $R_6$ of the group of formula —COO$^-$(NH$_2$R$_1$—R$_5$—NHR$_6$)$^+$ is alkyl, the polymeric sorbent after exposure to the aldehyde R$_2$—(CO)—H can have groups of formula —COO$^-$ $(NH_2R_1-R_5-NR_6-CHR_2-OH)^+$. Additional amounts of aldehyde can react with any remaining primary amino group or secondary amino group.

In yet other embodiments, the polymeric sorbent is formed using a compound of Formula (V-4) as the nitrogen-containing compound.

$$NH_2-(C=NH)-HN-R_5-NHR_1 \qquad (V-4)$$

The resulting polymeric sorbent can have nitrogen-containing groups of formula $-COO^-(NH_3-(C=NH)-NH-R_5-NHR_1)^+$, $-COO^-(NH_2R_1-R_5-NH-(C=NH)-NH_2)^+$, or both. If the terminal $R_1$ of the group of formula $-COO^{31}$ $(NH_3-(C=NH)-NH-R_5-NHR_1)^+$ is hydrogen, the polymeric sorbent after exposure to the aldehyde $R_2-(CO)-H$ can have groups of formula $-COO^{31}$ $(NH_3-(C=NH)-NH-R_5-NH-CHR_2-OH)^+$, $-COO^{31}$ $(NH_3-(C=NH)-NH-R_5-N(CHR_2-OH)_2)^+$, $-COO^{31}$ $(NH_3-(C=NH)-NH-R_5-N=CR_2H)^+$, or a mixture thereof. If the terminal $R_1$ of the group of formula $-COO^{31}$ $(NH_3-(C=NH)-NH-R_5-NHR_1)^+$ is an alkyl, the polymeric sorbent after exposure to the aldehyde $R_2-(CO)-H$ can have groups of formula $-COO^{31}$ $(NH_3-(C=NH)-NH-R_5-NR_1-CHR_2-OH)^+$. If the polymeric sorbent has groups of formula $-COO^{31}$ $(NH_2R_1-R_5-NH-(C=NH)-NH_2)^+$, the polymeric sorbent after exposure to the aldehyde $R_2-(CO)-H$ can have groups of formula $-COO^{31}$ $(NH_2R_1-R_5-NH-(C=NH)-NH-CHR_2-OH)^+$, $-COO^{31}$ $(NH_2R_1-R_5-NH-(C=NH)-N(CHR_2-OH)_2)^+$, $-COO^{31}$ $(NH_2R_1-R_5-NH-(C=NH)-N=CR_2H)^+$, or a mixture thereof. Additional amounts of aldehyde can react with any remaining primary amino group or secondary amino group.

In yet further embodiments, the polymeric sorbent is formed using a compound of Formula (V-5)

$$H_2N-(C=NH)-NHR_1 \qquad (V-5)$$

as the nitrogen-containing compound. The resulting polymeric sorbent can have nitrogen-containing groups of formula $-COO^{31}$ $(NH_3-(C=NH)-NHR_1)^+$, $-COO^{31}$ $(NH_2R_1-(C=NH)-NH_2)^+$, or both. If the terminal $R_1$ of the group of formula $-COO^{31}$ $(NH_3-(C=NH)-NHR_1)^+$ is hydrogen, the polymeric sorbent after exposure to the aldehyde $R_2-(CO)-H$ can have groups of formula $-COO^{31}$ $(NH_3-(C=NH)-NH-CHR_2-OH)^+$, $-COO^{31}$ $(NH_3-(C=NH)-N(CHR_2-OH)_2)^+$, $-COO^{31}$ $(NH_3-(C=NH)-N=CR_2H)^+$, or a mixture thereof. If the terminal $R_1$ of the group of formula $-COO^{31}$ $(NH_3-(C=NH)-NHR_1)^+$ is alkyl, the polymeric sorbent after exposure to the aldehyde $R_2-(CO)-H$ can have groups of formula $-COO^{31}$ $(NH_3-(C=NH)-NR_1-CHR_2-OH)^+$. If the polymeric sorbent has groups of formula $-COO^{31}$ $(NH_2R_1-(C=NH)-NH_2)^+$, the polymeric sorbent after exposure to the aldehyde $R_2-(CO)-H$ can have groups of formula $-COO^{31}$ $(NH_2R_1-(C=NH)-NH-CHR_2-OH)^+$, $-COO^{31}$ $(NH_2R_1-(C=NH)-N(CHR_2-OH)_2)^+$, $-COO^{31}$ $(NH_2R_1-(C=NH)-N=CR_2H)^+$, or a mixture thereof. Additional amounts of aldehyde can react with any remaining primary amino group or secondary amino group.

In still further embodiments, the polymeric sorbent is formed using a compound of Formula (VI) as the nitrogen-containing compound.

$$R_7-(NHR_1)_z \qquad (VI)$$

The resulting polymeric sorbent can have nitrogen-containing groups of formula $-COO^{31}$ $(NH_2R_1-R_7-(NHR_1)_{z-1})^+$. If one of the terminal $R_1$ of the group of formula $-COO^-(NH_2R_1-R_7-(NHR_{z-1})^+$ is hydrogen, the polymeric sorbent after exposure to the aldehyde $R_2-(CO)-H$ can have groups of formula $-COO^{31}$ $(NH_2R_1-R_7-(NHR_1)_{z-2}(NH-CHR_2OH))^+$, $-COO^{31}$ $(NH_2R_1-R_7-(NHR_1)_{z-2}(N(CHR_2OH)_2))^+$, $-COO^{31}$ $(NH_2R_1-R_7-(NHR_1)_{z-2}(N=CR_2H))^+$, or a mixture thereof. If one of the terminal $R_1$ of the group of formula $-COO^{31}$ $(NH_2R_1-R_7-(NHR_1)_{z-1})^+$ is alkyl, the polymeric sorbent after exposure to the aldehyde $R_2-(CO)-H$ can have groups of formula $-COO^{31}$ $(NH_2R_1-R_7-(NHR_1)_{z-2}(NR_1-CHR_2OH))^+$. In some of these embodiments, more than one terminal $-NHR_1$ group can react with the aldehyde. In addition to the terminal groups, the aldehyde can react with any other primary and/or secondary amino group on the polymeric sorbent.

The amount of aldehyde sorbed by the polymeric sorbent at room temperature (e.g., 25° C.) and standard pressure is often at least 0.5 mmoles/gram (i.e., at least 0.5 mmoles of aldehyde per gram of polymeric sorbent). For example, the amount of aldehyde sorbed can be at least 1 mmole/gram, at least 1.5 mmoles/gram, at least 2 mmoles/gram, at least 2.5 mmoles/gram, at least 3 mmoles/gram, at least 3.5 mmoles/gram, at least 4 mmoles/gram, at least 4.5 mmoles/gram, or at least 5 mmoles/gram. The amount sorbed can be up to 15 mmoles/gram, up to 12 mmoles/gram or even higher, up to 10 mmoles/gram, up to 9 mmoles/gram, up to 8 mmoles/gram, or up to 7 mmoles/gram. The amount sorbed is often in a range of 0.5 to 12 mmoles/gram, in a range of 1 to 12 mmoles/gram, in a range of 2 to 12 mmoles/gram, in a range of 1 to 10 mmoles/gram, in a range of 2 to 10 mmoles/gram, in a range of 3 to 12 mmoles/gram, in a range of 3 to 10 mmoles/gram, or in a range of 3 to 8 mmoles/gram.

Various embodiments are provided that are a polymeric sorbent, a method of preparing a polymeric sorbent, a method of sorbing aldehyde on a polymeric sorbent, a composition comprising a polymeric sorbent and aldehyde sorbed on the polymeric sorbent, or composite granules containing the polymeric sorbent.

Embodiment 1A is a polymeric sorbent comprising a reaction product of a) a hydrolyzed divinylbenzene/maleic anhydride polymeric material having carboxylic acid groups and b) a nitrogen-containing compound having at least two amino groups of formula —NHR, wherein R is hydrogen or alkyl and wherein the nitrogen-containing compound is attached to the hydrolyzed divinylbenzene/maleic anhydride polymeric material with an ionic bond.

Embodiment 2A is the polymeric sorbent of embodiment 1A, wherein the hydrolyzed divinylbenzene/maleic anhydride polymeric material is a hydrolyzed product of a divinylbenzene/maleic anhydride precursor material, the divinylbenzene/maleic anhydride precursor material being formed from a polymerizable composition comprising 1) 8 to 65 weight percent maleic anhydride based on the total weight of monomers in the polymerizable composition, 2) 30 to 85 weight percent divinylbenzene based on the total weight of monomers in the polymerizable composition, and 3) 0 to 40 weight percent of a styrene-type monomer based on the total weight of monomers in the polymerizable composition, wherein the styrene-type monomer is styrene, an alkyl-substituted styrene, or a combination thereof.

Embodiment 3A is the polymeric sorbent of embodiment 1A or 2A, wherein the polymerizable composition comprises 15 to 65 weight percent maleic anhydride, 30 to 85 weight percent divinylbenzene, and 0 to 40 weight percent of a styrene-type monomer based on the total weight of monomers in the polymerizable composition.

Embodiment 4A is the polymeric sorbent of any one of embodiments 1A to 3A, wherein the polymerizable composition comprises 25 to 65 weight percent maleic anhydride, 30 to 75 weight percent divinylbenzene, and 1 to 20 weight percent styrene-type monomer based on the total weight of monomers in the polymerizable composition.

Embodiment 5A is the polymeric sorbent of any one of embodiments 1A to 4A, wherein the polymerizable composition comprises 30 to 65 weight percent maleic anhydride, 30 to 70 weight percent divinylbenzene, and 1 to 20 weight percent styrene-type monomer based on the total weight of monomers in the polymerizable composition.

Embodiment 6A is the polymeric sorbent of any one of embodiments 1A to 5A, wherein the nitrogen-containing compound is of Formula (V)

$$R_4NHR_1 \quad (V)$$

wherein $R_1$ is hydrogen or an alkyl. $R_4$ is a group of formula $-R_5-NHR_6$, or $-(C=NH)-NH_2$. $R_5$ is an alkylene, a (hetero)arylene, a (hetero)aralkylene, a heteroalkylene having one or more oxy (—O—) groups, or a heteroalkylene having one or more —NH-groups. $R_6$ is hydrogen, alkyl, or $-(C=NH)-NH_2$.

Embodiment 7A is the polymeric sorbent of embodiment 6A, wherein the polymeric sorbent has ionic groups of formula $-COO^{31}$ $(NH_2R_1R_4)^+$.

Embodiment 8A is the polymeric sorbent of embodiment 6A, wherein the nitrogen-containing compound is of Formula (V-1).

$$R_6HN-R_5-NHR_1 \quad (V-1)$$

In Formula (V-1), $R_1$ is hydrogen or an alkyl; $R_5$ is an alkylene, a (hetero)arylene, a (hetero)aralkylene, a heteroalkylene having one or more oxy (—O—) groups, or a heteroalkylene having one or more —NH-groups, wherein the (hetero)arylene and (hetero)aralkylene is optionally substituted with a primary amino group and/or a secondary amino group; and $R_6$ is hydrogen, alkyl, or $-(C=NH)-NH_2$.

Embodiment 9A is the polymeric sorbent of embodiment 8A, wherein the polymeric sorbent has ionic groups of formula $-COO^{31}$ $(NH_2R_6-R_5-NHR_1)^+$, $-COO^{31}$ $(NH_2R_1-R_5-NHR_6)^+$, or both.

Embodiment 10A is the polymeric sorbent of embodiment 8A or 9A, wherein $R_5$ is an alkylene and the nitrogen-containing compound is an alkylene diamine. Example alkylene diamines include, but are not limited to, methylene diamine, ethylene diamine, propylene diamine, butylene diamine, and N,N'-dimethylethylene diamine.

Embodiment 11A is the polymeric sorbent of embodiment 8A or 9A, wherein $R_5$ is a (hetero)arylene that is optionally substituted with a primary amino group and/or a secondary amino group. Example nitrogen-containing compounds are phenylene diamine and melamine.

Embodiment 12A is the polymeric sorbent of embodiment 8A or 9A, wherein $R_5$ is a heteroalkylene and the nitrogen-containing compound is of Formula (V-2) or Formula (V-3).

$$R_6HN-R_a-[O-R_b]_n-NHR_1 \quad (V-2)$$

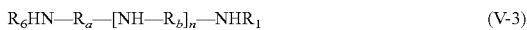

$$R_6HN-R_a-[NH-R_b]_n-NHR_1 \quad (V-3)$$

In these formulas, $R_a$ is an alkylene; $R_b$ is an alkylene; and n is an integer in a range of 1 to 50.

Embodiment 13A is the polymeric sorbent of embodiment 12A, wherein the nitrogen-containing compound is of Formula (V-2) and is a polyethylene glycol diamine or a polypropylene glycol diamine.

Embodiment 14A is the polymeric sorbent of embodiment 12A, wherein the nitrogen-containing compound is of Formula (V-3) and is diethylene triamine, triethylene tetramine, or tetraethylene pentamine.

Embodiment 15A is the polymeric sorbent of embodiment 8A, wherein the nitrogen-containing compound of Formula (V-1) is of Formula (V-4).

$$NH_2-(C=NH)-HN-R_5-NHR_1 \quad (V-4)$$

Embodiment 16A is the polymeric sorbent of embodiment 15A, wherein the polymeric sorbent has ionic groups of formula $-COO^{31}$ $(NH_3-(C=NH)-NH-R_5-NHR_1)^+$, $-COO^-(NH_2R_1-R_5-NH-(C=NH)-NH_2)^+$, or both.

Embodiment 17A is the polymeric sorbent of embodiment 15A or 16A, wherein $R_5$ is an alkylene.

Embodiment 18A is the polymeric sorbent of any one of embodiments 15A to 17A, wherein the nitrogen-containing compound is agmatine.

Embodiment 19A is the polymeric sorbent of embodiment 8A, wherein the nitrogen-containing compound of Formula (V-1) is of Formula (V-5).

$$H_2N-(C=NH)-NHR_1 \quad (V-5)$$

Embodiment 20A is the polymeric sorbent of embodiment 19A, wherein the polymeric sorbent has ionic groups of formula $-COO^-(NH_3-(C=NH)-NHR_1)^+$, $-COO^{31}$ $(NH_2R_1-(C=NH)-NH_2)^+$, or both.

Embodiment 21A is the polymeric sorbent of embodiment 19A or 20A, wherein the nitrogen-containing compound is guanidine.

Embodiment 22A is the polymeric sorbent of any one of embodiments 1A to 5A, wherein the nitrogen-containing compound is of Formula (VI).

$$R_7-(NHR_1)_z \quad (VI)$$

Group $R_7$ is a z-valent radical of an alkane or a z-valent radical of a heteroalkane. Group $R_1$ is hydrogen or alkyl. The variable z is an integer in a range of 3 to 10.

Embodiment 23A is the polymeric sorbent of embodiment 22A, wherein the polymeric sorbent has ionic groups of formula $-COO^{31}$ $(NH_2R_1-R_7-(NHR_1)_{z-1})^+$.

Embodiment 24A is the polymeric sorbent of any one of embodiments 1A to 23A, wherein the nitrogen-containing compound has a molecular weight no greater than 2000 Daltons.

Embodiment 25A is the polymeric sorbent of any one of embodiments 1A to 24A, wherein the polymeric sorbent further comprises an acid-base dye.

Embodiment 26A is the polymeric sorbent of embodiment 25A, wherein the acid-base dye has a lower $pK_b$ than the nitrogen-containing compound.

Embodiment 27A is the polymeric sorbent of embodiment 25A or 26A, wherein a difference between the $pK_b$ of the nitrogen-containing compound and the $pK_b$ of the acid-base dye is equal to at least 2.

Embodiment 28A is the polymeric sorbent of any one of embodiments 1A to 27A, wherein the hydrolyzed divinylbenzene/maleic anhydride polymeric material has a BET specific surface area of at least 50 $m^2/g$.

Embodiment 1B is a method of sorbing an aldehyde on a polymeric sorbent. The method includes providing a polymeric sorbent of any one of embodiments 1A to 28A and sorbing an aldehyde on the polymeric sorbent. The aldehyde is of Formula (I)

$$R_2-(CO)-H \quad (I)$$

wherein $R_2$ is hydrogen, alkyl, vinyl, or aryl. The molecular weight of the aldehyde of Formula (I) is no greater than 200 grams/mole.

Embodiment 2B is the method of embodiment 1B, wherein $R_2$ is hydrogen (the aldehyde is formaldehyde) or methyl (the aldehyde is acetaldehyde).

Embodiment 3B is the method of embodiment 1B or 2B, wherein the polymeric sorbent sorbs an amount of aldehyde in a range of 0.5 to 15 millimoles per gram based on the weight of the polymeric sorbent.

Embodiment 4B is the method of any one of embodiments 1B to 3B, wherein the polymeric sorbent comprises an acid-base dye and wherein the acid-base dye changes color when the aldehyde sorption capacity of the polymeric sorbent is reached or is close to being reached.

Embodiment 1C is a composition comprising (a) a polymeric sorbent of any one of embodiments 1A to 28A and (b) an aldehyde sorbed on the polymeric sorbent. The aldehyde is of Formula (I).

$$R_2\text{—(CO)—H} \tag{I}$$

In Formula (I), $R_2$ is hydrogen, alkyl, vinyl, or aryl. The molecular weight of the aldehyde of Formula (I) is no greater than 200 grams/mole.

Embodiment 2C is the composition of embodiment 1C, wherein $R_2$ is hydrogen (the aldehyde is formaldehyde) or methyl (the aldehyde is acetaldehyde).

Embodiment 3C is the composition of embodiment 1C or 2C, wherein the polymeric sorbent sorbs an amount of aldehyde in a range of 0.5 to 15 millimoles per gram based on the weight of the polymeric sorbent.

Embodiment 4C is the composition of any one of embodiments 1C to 3C, wherein the polymeric sorbent comprises an acid-base dye and wherein the acid-base dye changes color when the aldehyde sorption capacity of the polymeric sorbent is reached or is close to being reached.

Embodiment 1D is a method of preparing a polymeric sorbent. The method includes providing a divinylbenzene/maleic anhydride precursor polymeric material, hydrolyzing the divinylbenzene/maleic anhydride precursor polymeric material to form a hydrolyzed divinylbenzene/maleic anhydride polymeric material having carboxylic acid groups, and reacting the hydrolyzed divinylbenzene/maleic anhydride polymeric material with a nitrogen-containing compound having at least two amino groups of formula —NHR wherein R is hydrogen or alkyl to form the polymeric sorbent, wherein the polymeric sorbent has an ionically attached nitrogen-containing group.

Embodiment 2D is the method of embodiment 1D, wherein the divinylbenzene/maleic anhydride precursor material is a polymerized product formed of a polymerizable composition comprising:

1) 8 to 65 weight percent maleic anhydride based on the total weight of monomers in the polymerizable composition;

2) 30 to 85 weight percent divinylbenzene based on the total weight of monomers in the polymerizable composition; and 3) 0 to 40 weight percent of a styrene-type monomer based on the total weight of monomers in the polymerizable composition, wherein the styrene-type monomer is styrene, an alkyl-substituted styrene, or a combination thereof.

Embodiment 3D is the method of embodiment 1D or 2D, wherein the polymerizable composition comprises 15 to 65 weight percent maleic anhydride, 30 to 85 weight percent divinylbenzene, and 0 to 40 weight percent of a styrene-type monomer based on the total weight of monomers in the polymerizable composition.

Embodiment 4D is the method of any one of embodiments 1D to 3D, wherein the polymerizable composition comprises 25 to 65 weight percent maleic anhydride, 30 to 75 weight percent divinylbenzene, and 1 to 20 weight percent styrene-type monomer based on the total weight of monomers in the polymerizable composition.

Embodiment 5D is the method of any one of embodiments 1D to 4D, wherein the polymerizable composition comprises 30 to 65 weight percent maleic anhydride, 30 to 70 weight percent divinylbenzene, and 1 to 20 weight percent styrene-type monomer based on the total weight of monomers in the polymerizable composition.

Embodiment 6D is the method of any one of embodiments 1D to 5D, wherein the nitrogen-containing compound has a molecular weight no greater than 2000 Daltons.

Embodiment 7D is the method of any one of embodiments 1D to 6D, wherein the nitrogen-containing compound is of Formula (V).

$$R_4 NHR_1 \tag{V}$$

Group $R_1$ is hydrogen or an alkyl. $R_4$ is a group of formula —$R_5$—$NHR_6$, or —(C=NH)—$NH_2$. $R_5$ is an alkylene, a (hetero)arylene, a (hetero)aralkylene, a heteroalkylene having one or more oxy (—O—) groups, or a heteroalkylene having one or more —NH-groups, wherein the (hetero)arylene and (hetero)aralkylene is optionally substituted with a primary amino group and/or a secondary amino group. $R_6$ is hydrogen, alkyl, or —(C=NH)—$NH_2$.

Embodiment 8D is the method of embodiment 7D, wherein the polymeric sorbent has ionic groups of formula —$COO^{31}$ ($NH_2R_1R_4$)$^+$.

Embodiment 9D is the method of embodiment 7D, wherein the nitrogen-containing compound is of Formula (V-1).

$$R_6 HN\text{—}R_5\text{—}NHR_1 \tag{V-1}$$

In Formula (V-1), $R_1$ is hydrogen or an alkyl; $R_5$ is an alkylene, a (hetero)arylene, a (hetero)aralkylene, a heteroalkylene having one or more oxy (—O—) groups, or a heteroalkylene having one or more —NH-groups, wherein the (hetero)arylene and (hetero)aralkylene is optionally substituted with a primary amino group and/or a secondary amino group; and $R_6$ is hydrogen, alkyl, or —(C=NH)—$NH_2$.

Embodiment 10D is the method of embodiment 9D, wherein the polymeric sorbent has ionic groups of formula —$COO^{31}$ ($NH_2R_6$—$R_5$—$NHR_1$)$^+$, —$COO^{31}$ ($NH_2R_1$—$R_5$—$NHR_6$)$^+$, or both.

Embodiment 11D is the method of embodiment 9D or 10D, wherein $R_5$ is an alkylene and the nitrogen-containing compound is an alkylene diamine. Example alkylene diamines include, but are not limited to, methylene diamine, ethylene diamine, propylene diamine, butylene diamine, and N,N'-dimethylethylene diamine.

Embodiment 12D is the method of embodiment 9D or 10D, wherein $R_5$ is a (hetero)arylene that is optionally substituted with a primary amino group and/or a secondary amino group. Example nitrogen-containing compounds are phenylene diamine and melamine.

Embodiment 13D is the method of embodiment 9D or 10D, wherein $R_5$ is a heteroalkylene and the nitrogen-containing compound is of Formula (V-2) or Formula (V-3).

$$R_6 HN\text{—}R_a\text{—}[O\text{—}R_b]_n\text{—}NHR_1 \tag{V-2}$$

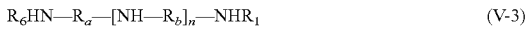
$$R_6 HN\text{—}R_a\text{—}[NH\text{—}R_b]_n\text{—}NHR_1 \tag{V-3}$$

In these formulas, $R_a$ is an alkylene; $R_b$ is an alkylene; and n is an integer in a range of 1 to 50.

Embodiment 14D is the method of embodiment 13D, wherein the nitrogen-containing compound is of Formula (V-2) and is a polyethylene glycol diamine or a polypropylene glycol diamine.

Embodiment 15D is the method of embodiment 14D, wherein the nitrogen-containing compound is of Formula (V-3) and is diethylene triamine, triethylene tetramine, or tetraethylene pentamine.

Embodiment 16D is the method of embodiment 9D, wherein the nitrogen-containing compound of Formula (V-1) is of Formula (V-4).

$$NH_2-(C=NH)-N-R_5-NHR_1 \quad (V\text{-}4)$$
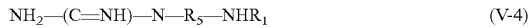

Embodiment 17D is the method of embodiment 16D, wherein the polymeric sorbent has ionic groups of formula $-COO^{31}$ $(NH_3-(C=NH)-H-R_5-NHR_1)^+$, $-COO^{31}$ $(NH_2R_1-R_5-NH-(C=NH)-NH_2)^+$, or both.

Embodiment 18D is the method of embodiment 16D or 17D, wherein $R_5$ is an alkylene.

Embodiment 19D is the method of any one of embodiments 16D to 18D, wherein the nitrogen-containing compound is agmatine.

Embodiment 20D is the method of embodiment 9D, wherein the nitrogen-containing compound of Formula (V-1) is of Formula (V-5).

$$H_2N-(C=NH)-NHR_1 \quad (V\text{-}5)$$

Embodiment 21D is the method of embodiment 20D, wherein the polymeric sorbent has ionic groups of formula $-COO^-(NH_3-(C=NH)-NHR_1)^+$, $-COO^{31}$ $(NH_2R_1-(C=NH)-NH_2)^+$, or both.

Embodiment 22D is the method of embodiment 20D or 21D, wherein the nitrogen-containing compound is guanidine.

Embodiment 23D is the method of any one of embodiments 1D to 6D, wherein the nitrogen-containing compound is of Formula (VI).

$$R_7-(NHR_1)_z \quad (VI)$$

Group $R_7$ is a z-valent radical of an alkane or a z-valent radical of a heteroalkane. $R^1$ is hydrogen or alkyl. The variable z is an integer in a range of 3 to 10.

Embodiment 24D is the method of embodiment 23D, wherein the polymeric sorbent has ionic groups of formula $-COO^{31}$ $(NH_2R_1-R_7-(NHR_1)_{z-1})^+$.

Embodiment 25D is the method of any one of embodiments 1D to 24D, wherein the nitrogen-containing compound has a molecular weight no greater than 2000 Daltons.

Embodiment 26D is the method of any one of embodiments 1D to 25D, wherein the polymeric sorbent further comprises an acid-base dye.

Embodiment 27D is the method of embodiment 26D, wherein the acid-base dye has a lower $pK_b$ than the nitrogen-containing compound.

Embodiment 28D is the method of embodiment 26D or 27D, wherein a difference between the $pK_b$ of the nitrogen-containing compound and the $pK_b$ of the acid-base dye is equal to at least 2.

Embodiment 29D is the method of any one of embodiments 1D to 28D, wherein the hydrolyzed divinylbenzene/maleic anhydride polymeric material has a BET specific surface area of equal to at least 50 $m^2$/grams.

Embodiment 1E is a composite granule that includes (a) a polymeric sorbent of any one of embodiments 1A to 28A and (b) a binder.

Embodiment 2E is the composite granules of embodiment 1E, wherein the composite granules comprise 1 to 30 weight percent binder and 70 to 99 weight percent polymeric sorbent based on the total weight of the composite granules.

Embodiment 3E is the composite granules of embodiment 1E or 2E, wherein the composite granules comprise 1 to 25 weight percent binder and 75 to 99 weight percent polymeric sorbent based on the total weight of the composite granules.

Embodiment 4E is the composite granules of any one of embodiments 1E to 3E, wherein the composite granules comprise 1 to 20 weight percent binder and 80 to 99 weight percent polymeric sorbent based on the total weight of the composite granules.

Embodiment 5E is the composite granules of any one of embodiments 1E to 4E, wherein the binder comprises metal hydroxides, metal oxides, or combinations thereof.

Embodiment 6E is the composite granules of any one of embodiments 1E to 4E, wherein the binder comprises a salt (e.g., a metal salt) or a polymer.

Embodiment 7E is the composite granules of embodiment 1E, wherein the binder comprises a silicate (e.g., a metal silicate).

Embodiment 8E is the composite granules of embodiment 7E, wherein the silicate comprises sodium silicate, potassium silicate, calcium silicate, magnesium silicate, sodium metasilicate, or a mixture thereof.

Embodiment 9E is the composite granules of embodiment 8E, wherein the silicate comprises sodium metasilicate.

Embodiment 10E is the composite granules of any one of embodiments 1E to 4E, wherein the binder comprises a polyorganozirconate, polyorganoaluminate, polysiloxane, polysilane, polysilazane, polycarbosilane, polyborosilane, zirconium dimethacrylate, zirconium tetramethacrylate, zirconium 2-ethylhexanoate, aluminum butoxide, aluminum diisopropoxide ethylacetoacetate, tetramethyldisiloxane, tristrimethylsilylphosphate, tristrimethylsiloxyboron, or a mixture thereof.

Embodiment 11E is the composite granules of any one of embodiments 1E to 4E, wherein the binder comprises a carboxylate salt.

Embodiment 12E is the composite granules of embodiment 11E, wherein the carboxylate anion has at least 10 carbon atoms.

Embodiment 13E is the composite granules of embodiment 11E or 12E, wherein the carboxylate salt comprises magnesium stearate.

Embodiment 14E is the composite granules of any one of embodiments 1E to 4E, wherein the binder comprises a thermoplastic polymer.

Embodiment 15E is the composite granules of any one of embodiments 1E to 4E, wherein the binder comprises a thermoset polymer.

Embodiment 16E is the composite granules of any one of embodiments 1E to 4E, wherein the binder comprises an elastomer.

Embodiment 17E is the composite granules of any one of embodiments 1E to 4E, wherein the binder comprises a naturally occurring polymer.

Embodiment 18E is the composite granules of embodiment 17E, wherein the naturally occurring polymer is a cellulosic resin.

Embodiment 19E is the composite granules of any one of embodiments 1E to 4E, wherein the binder comprises an electrically conductive polymer.

Embodiment 20E is the composite granules of any one of embodiments 1E to 4E, wherein the binder comprises a gelling material, an absorbent material, or mixture thereof.

Embodiment 21E is the composite granules of embodiment 20E, wherein the binder comprises a superabsorbent material comprising polyacrylic acid, polyacrylamide, polyalcohol, polyamine, polyethylene oxide, cellulose including carboxymethyl cellulose, chitin, gelatin, starch, polyvinyl alcohol, polyacrylonitrile, alginic acid, carrageenan isolated from seaweed, polysaccharide, pectin, xanthan, polydiallyldimethylammonium chloride, polyvinylpyridine, polyvinylbenzyltrimethylammonium salt, polyvinyacetate, polylactic acid, or mixture thereof.

Embodiment 1F is a method of making composite granules. The method includes preparing a polymeric sorbent according to any one of embodiments 1D to 29D. The method still further includes blending the polymeric sorbent with a binder to form a blended material and preparing the composite granules from the blended material.

Embodiment 2F is the method of embodiment 1F, wherein preparing the composite granules from the blended material comprises forming pellets or disks from the blended material, milling the pellets or disks to form a milled product, and sieving the milled product to collect a sieved product.

Embodiment 1G is a method of sorbing (i.e., capturing) an aldehyde. The method includes providing composite granules of any one of embodiments 1E to 21E. The method further includes exposing the composite granules to an aldehyde and sorbing the aldehyde on the polymeric sorbent. The aldehyde is of Formula (I)

$$R_2\text{—(CO)—H} \tag{I}$$

wherein $R_2$ is hydrogen, alkyl, vinyl, or aryl. The molecular weight of the aldehyde of Formula (I) is no greater than 200 grams/mole.

EXAMPLES

Materials:

The materials with their sources were as listed in Table 1. Unless otherwise indicated, all materials were purchased from commercial sources and used as received.

TABLE 1

List of materials.

| Chemical Name | Chemical Supplier |
| --- | --- |
| Divinylbenzene (DVB) (80% technical grade), which contained 80 weight percent DVB and 20 weight percent styrene-type monomers. The calculation of moles of DVB used to prepare the polymeric material takes into account the purity. | Sigma-Aldrich, Milwaukee, WI |
| Maleic anhydride (MA) | Alfa Aesar, Ward Hill, MA |
| 2,2'-azobis(2,4-dimethyl-pentanenitrile) (available under the trade designation VAZO 52 from E. I. du Pont de Nemours) | E. I. du Pont de Nemours, Wilmington, DE |
| Benzoyl peroxide (BPO) | Sigma-Aldrich, Milwaukee, WI |
| Ethyl acetate (EtOAc) | EMD Millipore Chemicals, Billerica, MA |
| Sodium hydroxide (NaOH) | EMD Millipore Chemicals, Billerica, MA |
| Concentrated hydrochloric acid, 37% (HCl) | EMD Millipore Chemicals, Billerica, MA |
| Ethyl alcohol (EtOH), denatured, anhydrous | EMD Millipore Chemicals, Billerica, MA |
| Ethylenediamine, 99% (EDA) | Alfa Aesar, Ward Hill, MA |
| Polyethyleneimine, 600 MW (PEI) | Polysciences, Warrington, PA |
| Diethylenetriamine, 99% (DETA) | Alfa Aesar, Ward Hill, MA |
| Isonicotinic acid hydrazide (IAH) | TCI, Portland, OR |

Gas Sorption Analysis:

Porosity and gas sorption experiments were performed using an Accelerated Surface Area and Porosimetry (ASAP) 2020 system from Micromeritics Instrument Corporation (Norcross, Ga.). The adsorbates were of ultra-high purity. The following is a typical method used for the characterization of the porosity within the exemplified materials. In a Micromeritics half inch (1.3 cm) diameter sample tube, 50-250 milligrams (mg) of material was degassed by heating under ultra-high vacuum (3-7 micrometers Hg) on the analysis port of the ASAP 2020 to remove residual solvent and other adsorbates. The degas procedure for the precursor polymeric material was 3 hours at 150° C.

Nitrogen adsorption isotherms at 77 K for the precursor polymeric material were obtained using low pressure dosing (5 cm$^3$/g) at a relative pressure)(p/p° less than 0.1 and a pressure table of linearly spaced pressure points from a p/p° in a range from 0.1 to 0.98. The method for all isotherms made use of the following equilibrium intervals: 90 seconds at p/p° less than $10^{-5}$, 40 seconds at p/p° in a range of $10^{-5}$ to 0.1, and 20 seconds at p/p° greater than 0.1. Helium was used for the free space determination, after nitrogen adsorption analysis, both at ambient temperature and at 77 K. BET specific surface areas (SA$_{BET}$) were calculated from nitrogen adsorption data by multipoint Brunauer-Emmett-Teller (BET) analysis. Apparent micropore distributions were calculated from nitrogen adsorption data by density functional theory (DFT) analysis using the standard nitrogen at 77 K DFT model. Total pore volume was calculated from the total amount of nitrogen adsorbed at a p/p° equal to approximately 0.98. BET, DFT and total pore volume analyses were performed using Micromeritics MicroActive Version 4.04 software.

Formaldehyde Capacity Test:

A simple flow-through custom built delivery system was used to deliver known concentrations of formaldehyde to the sample for measurement. Plastic tubing was used throughout the delivery system, with the portions downstream of the formaldehyde generation being fluoropolymer tubing. Formaldehyde was generated by delivering a 4.86 weight percent solution of paraformaldehyde in water using a 2.5 milliliter (mL) GASTIGHT syringe (product number 81420, Hamilton Company, Reno, Nev.). This syringe was driven at a specific rate by a syringe pump, model 780200-V (KD Scientific, Holliston, Mass.). By knowing the paraformaldehyde concentration in solution, and the cross-sectional area of the syringe, a precise rate of paraformaldehyde solution could be delivered. This solution was delivered onto a piece of hot gold foil in a flask which served to decompose the paraformaldehyde and vaporize the resulting formaldehyde. Through this flask, 250 mL/minute of nitrogen gas was passed, controlled by an analog mass flow controller, model GFC17, with a range of 0-500 mL/min (Aalborg, Orangeburg, N.Y.). This controller was calibrated by placing a model 800286 GILIBRATOR soap bubble flow meter with a 20-6000 mL calibration cell (Sensidyne, St. Petersburg, Fla.) at the output of the controller. The GILIBRATOR flow meter was used to measure a range of flows from each flow controller that was used to generate calibration curves. The evaporation of the formaldehyde served to create a 250 parts per million (ppm) concentration of formaldehyde in the nitrogen. Water was also evaporated into the nitrogen which humidified the stream to approximately 50% relative humidity. Using these calibration curves, the mass flow controllers were set to deliver the desired formaldehyde concentration (250 ppm formaldehyde) and humidity (50% relative humidity) at the desired gas flow rate (250 mL/minute).

The formaldehyde removal capacity for a test material was determined by adding the test material to a tared test tube until the bed depth in the tube was 1.0 cm after being tamped. The inner diameter of the test tube was 1.0 cm. The mass of the test material was then determined by weighing the test materials in the test tube. The test tube was then connected in line with the system, allowing the 250 ppm formaldehyde gas stream to flow through the test material. To the downstream side of the test tube, tubing was connected that led to a gas chromatograph instrument (SRI 8610C, SRI Instruments, Torrance, Calif.). At the time the formaldehyde gas stream began to pass through the test sample, the test was considered started, and a timer was started. The gas chromatograph then periodically sampled the gas stream and passed the sample through a 15 meter long RT-U-BOND column with an inner diameter of 0.53 millimeters (Restek Corporation, Bellefonte, Pa.). The gas chromatograph software recorded the timestamp of every data point taken.

The effluent from this column was then passed through a methanizer equipped with a flame ionization detector (FID). The methanizer converted the formaldehyde to methane, which was then ionized and detected by the FID. This signal was subsequently reported and recorded in the data acquisition software provided with the device. It was observed that good detection of formaldehyde vapor was found when the gas chromatograph sampled the gas stream for 6 seconds, allowed the sample to pass through the column for 144 seconds and then allowed 60 seconds to flush out the sample before it drew in the next sample to be analyzed.

Prior to testing, different rates of formaldehyde were delivered into the nitrogen gas stream to calibrate the gas chromatograph software. In this way, a signal to concentration curve could be made so that any level of signal on the gas chromatograph could be correlated to a concentration of formaldehyde.

The end point of the formaldehyde capacity test was defined as the point corresponding to the time at which the formaldehyde effluent passing through the bed of the test material produced a signal on the FID detector that exceeded the signal corresponding to 1 ppm. The performance of each test material was reported as the number of minutes until 1 ppm breakthrough was observed performing the test as described above. In addition, the area under the curve of the breakthrough plot until 1 ppm breakthrough coupled with the known mass of the test material used in this fixed volume test was used to calculate a millimole/gram (mmol/g) capacity for each test material using a sum of least squares equation.

Preparatory Example 1: Preparation of Precursor Polymeric Material

In a 2 liter (L) Parr stainless steel pressure vessel, 177.11 grams (g) (1.09 moles) divinylbenzene (DVB, 80 weight % technical grade), 240.05 g (2.45 moles) of maleic anhydride (MA), and 4.17 g (16.8 mmol) of 2,2'-azobis(2,4-dimethylpentanenitrile) (VAZO 52) were dissolved in 625.92 g of ethyl acetate (EtOAc). The polymerizable composition had 40.0 weight % solids in EtOAc and contained a monomer mixture (34.0 weight % DVB, 57.5 weight % MA, and 8.5 weight % styrene-type monomers) and 1 weight % VAZO 52 (based on total weight of monomers). The polymerizable composition was bubbled with nitrogen for 15 minutes. The pressure vessel was then sealed and placed in a water bath at 60° C. The polymerizable composition was heated at this elevated temperature for 18 hours. A white precipitate that had formed was isolated by vacuum filtration and washed with EtOAc. The solid was placed in a 4 L Erylenmeyer flask and 2.0 L of EtOAc was added to the flask. The solid was allowed to stand in EtOAc for one hour at room temperature. The solid was again isolated by vacuum filtration and washed with EtOAc. The solid was placed in a 4 L Erylenmeyer flask and 2.0 L of EtOAc was added to the flask. The solid was allowed to stand in EtOAc overnight. The solid was again isolated by vacuum filtration and washed with EtOAc. The solid was then dried in a batch oven at 100° C. for 18 hours. This precursor polymeric material had a $SA_{BET}$ of 343.3 m$^2$/gram and a total pore volume of 0.593 cm$^3$/gram (p/p° equal to 0.979) as determined by nitrogen adsorption.

Preparatory Example 2: Preparation of Hydrolyzed Precursor Polymeric Material

The precursor polymeric material described in Preparatory Example 1 was treated with a hydrolyzing agent (sodium hydroxide (NaOH)). More specifically, 58.8 g (1.47 moles) of NaOH was dissolved in 490 mL of deionized water within a 1 L jar. To this solution was added 50.0 g of the precursor polymeric material which had been ground and sieved to a particle size range of 40×80 mesh by isolation using USA standard test No. 40 and 80 wire mesh sieves (ASTM E-11 standard; Hogentogler and Co., Inc., Columbia, Md.) and a Meinzer II Sieve Shaker (CSC Scientific Company, Inc., Fairfax, Va.) operated for 15 minutes before the separated material was collected.

The jar was then capped and placed on a jar roller. This suspension was allowed to roll at room temperature for 18 hours. The solid was isolated by vacuum filtration and washed with deionized water. The solid was returned to the 1 L jar, and to the jar was added 515 mL of 2.1 Molar (M) aqueous hydrochloric acid (HCl) (80 mL of concentrated HCl added to 435 mL of deionized water). The jar was capped and placed back onto a jar roller where it was allowed to roll overnight at room temperature. The solid was again isolated by vacuum filtration and washed with deionized water. The solid was then dried under high vacuum at 95° C. for eight hours.

Examples 1-7

The following examples were prepared by reacting the hydrolyzed precursor polymeric material of Preparatory Example 2 with a nitrogen-containing compound (e.g., amine compound) containing two or more amino groups in ethanol (EtOH). The identity of the amine compound, the amount of amine compound reacted with the hydrolyzed precursor polymeric material, the equivalents of the amine compound per MA and the concentration of the amine compound in the amine/EtOH solution used for the reaction are summarized in Table 2. More specifically, the amine compound was dissolved into enough EtOH to prepare each amine solution with the concentrations listed in Table 2. To each of these solutions was added 3.0 g (40×80 mesh, obtained as described previously) of the hydrolyzed precursor polymeric material of Preparatory Example 2. The hydrolyzed precursor polymeric material was allowed to soak in each amine solution at room temperature for 18 hours. The solids were each isolated by vacuum filtration and washed with EtOH. Each solid was then put back in an 8 ounce (oz.) jar containing 200 mL of EtOH. The solids were allowed to soak in the EtOH for 18 hours. The solids were isolated by vacuum filtration and washed with EtOH.

The solid material was then dried in an oven under high vacuum at 90° C. for 18 hours. The resulting amine salt functional polymeric sorbents (40×80 mesh, obtained as described previously) were used to perform the formaldehyde capacity test, as described above, to determine the formaldehyde capacity of each amine salt functional polymeric sorbent. The mass of sample used for the test, the number of minutes each test lasted and the calculated mmol/g capacity (mmoles of formaldehyde per gram of polymeric sorbent) are shown in Table 3.

TABLE 2

Type, amount, equivalents, and concentration of amine solution used in the functionalization step to prepare each polymeric sorbent.

| Example # | Amine Compound Type | Amine Compound Amount | Equivalents of Amine Compound per MA | Concentration of Amine Compound in EtOH (mol/L) |
|---|---|---|---|---|
| Example 1 | EDA | 2.0 mL | 2 | 1.5 |
| Example 2 | EDA | 20 mL | 17 | neat |
| Example 3 | PEI | 10 mL | 1 | 0.86 |
| Example 4 | PEI | 20 mL | 2 | 0.86 |
| Example 5 | PEI | 40 mL | 3 | 0.86 |
| Example 6 | DETA | 1.9 mL | 1 | 1.2 |
| Example 7 | DETA | 3.8 mL | 2 | 1.2 |

Comparative Example 1

The material of Comparative Example 1 was an activated carbon (which had been sieved to a particle size range of 32×60 mesh by isolation utilizing USA standard test No. 32 and 60 wire mesh sieves (ASTM E-11 standard; Hogentogler and Co., Inc., Columbia, Md.) and a Meinzer II Sieve Shaker (CSC Scientific Company, Inc., Fairfax, Va.) operated for 15 minutes before the separated material was collected) used in the commercially available 3M GAS AND VAPOUR FILTERS 6000 SERIES cartridges (3M, Maplewood, Minn.) rated for formaldehyde and organic vapors. The formaldehyde capacity of this carbon arises from its impregnation with a half neutralized aqueous solution of sulfamic acid. The impregnated carbon was used to perform the formaldehyde capacity test, as described above, to determine the formaldehyde capacity of this impregnated carbon. The mass of sample used for the test, the number of minutes the test lasted and the calculated mmol/g capacity (mmoles of formaldehyde per gram of comparative sorbent) are shown in Table 3.

Comparative Example 2

The material of Comparative Example 2 contained a comparative sorbent prepared by reacting the hydrolyzed precursor polymeric material, described in Preparatory Example 2, with isonicotinic acid hydrazide (IAH). More specifically, 2.42 g (17.6 mmol) of IAH was dissolved in 36 mL of EtOH within a 4 oz. jar while being heated in a sand bath to 80° C. To this, 3.0 g of the hydrolyzed precursor polymeric material was added. The hydrolyzed precursor polymeric material was allowed to react while heated at 80° C. for 18 hours. The solid was then isolated by vacuum filtration and washed with EtOH. The solid was placed back in a 4 oz. jar and 50 mL of EtOH was added to the jar. The jar was returned to the sand bath, and the solid was allowed to stand in EtOH overnight at 80° C. The solid was again isolated by vacuum filtration and washed with EtOH. The solid was then dried in an oven under high vacuum at 90° C. for eight hours. The resulting comparativesorbent (which had been sieved to a particle size range of 40×80 mesh by isolation utilizing USA standard test No. 40 and 80 wire mesh sieves (ASTM E-11 standard; Hogentogler and Co., Inc., Columbia, Md.) and a Meinzer II Sieve Shaker (CSC Scientific Company, Inc., Fairfax, Va.) operated for 15 minutes before the separated material was collected) was used to perform the formaldehyde capacity test, as described above, to determine the formaldehyde capacity of this comparative sorbent. The mass of sample used for the test, the number of minutes the test lasted and the calculated mmol/g capacity (mmoles of formaldehyde per gram of comparative sorbent) are shown in Table 3.

Comparative Example 3

The material of Comparative Example 3 contained a comparative sorbent prepared by reacting a hydrolyzed precursor polymeric material, described in Preparatory Example 2, with isonicotinic acid hydrazide (IAH). More specifically, 4.83 g (35.2 mmol) of IAH was dissolved in 72 mL of EtOH within an 8 oz. jar while being heated in a sand bath to 80° C. To this, 3.0 g of the hydrolyzed precursor polymeric material was added. The hydrolyzed precursor polymeric material was allowed to react while heated at 80° C. for 18 hours. The solid was then isolated by vacuum filtration and washed with EtOH. The solid was placed back in an 8 oz. jar and 50 mL of EtOH was added to the jar. The jar was returned to the sand bath, and the solid was allowed to stand in EtOH overnight at 80° C. The solid was again isolated by vacuum filtration and washed with EtOH. The solid was then dried in an oven under high vacuum at 90° C. for eight hours. The resulting comparativesorbent (which had been sieved to a particle size range of 40×80 mesh by isolation utilizing USA standard test No. 40 and 80 wire mesh sieves (ASTM E-11 standard; Hogentogler and Co., Inc., Columbia, Md.) and a Meinzer II Sieve Shaker (CSC Scientific Company, Inc., Fairfax, Va.) operated for 15 minutes before the separated material was collected) was used to perform the formaldehyde capacity test, as described above, to determine the formaldehyde capacity of this comparative sorbent. The mass of sample used for the test, the number of minutes the test lasted and the calculated mmol/g capacity (mmoles of formaldehyde per gram of comparative sorbent) are shown in Table 3.

TABLE 3

Formaldehyde Capacity Test results for the sorbents of Examples 1-7 and Comparative Examples 1-3.

| Example # | Test material mass (g) | Minutes until 1 ppm Breakthrough (min) | 1 ppm Breakthrough Capacity (mmol/g) |
|---|---|---|---|
| Example 1 | 0.330 | 655 | 4.95 |
| Example 2 | 0.302 | 531 | 4.40 |
| Example 3 | 0.327 | 332 | 2.54 |
| Example 4 | 0.385 | 604 | 3.92 |
| Example 5 | 0.346 | 439 | 3.17 |
| Example 6 | 0.321 | 693 | 5.41 |
| Example 7 | 0.311 | 828 | 6.66 |
| Comparative Example 1 | 0.443 | 117 | 1.00 |
| Comparative Example 2 | 0.305 | 61 | 0.50 |
| Comparative Example 3 | 0.309 | 76 | 0.62 |

What is claimed is:

1. A composition comprising:
   (a) a polymeric sorbent comprising a reaction product of
       a hydrolyzed divinylbenzene/maleic anhydride polymeric material having carboxylic acid groups; and
       a nitrogen-containing compound having at least two amino groups of formula —NHR wherein R is hydrogen or alkyl and wherein the nitrogen-containing compound is attached to the hydrolyzed divinylbenzene/maleic anhydride polymeric material with an ionic bond; and
   (b) an aldehyde sorbed on the polymeric sorbent, the aldehyde being of Formula (I)

$$R_2-(CO)-H \qquad (I)$$

wherein $R_2$ is hydrogen, alkyl, vinyl, or aryl and wherein the molecular weight of the aldehyde of Formula (I) is no greater than 200 grams/mole.

2. The composition of claim 1, wherein the hydrolyzed divinylbenzene/maleic anhydride polymeric material is a hydrolyzed product of a divinylbenzene/maleic anhydride precursor material, the divinylbenzene/maleic anhydride precursor material being formed from a polymerizable composition comprising
   1) 8 to 65 weight percent maleic anhydride based on the total weight of monomers in the polymerizable composition;
   2) 30 to 85 weight percent divinylbenzene based on the total weight of monomers in the polymerizable composition; and
   3) 0 to 40 weight percent of a styrene-type monomer based on the total weight of monomers in the polymerizable composition, wherein the styrene-type monomer is styrene, an alkyl-substituted styrene, or a combination thereof.

3. The composition of claim 2, wherein the polymerizable composition comprises 15 to 65 weight percent maleic anhydride, 30 to 85 weight percent divinylbenzene, and 0 to 40 weight percent styrene-type monomer.

4. The composition of claim 2, wherein the polymerizable composition comprises 25 to 65 weight percent maleic anhydride, 30 to 75 weight percent divinylbenzene, and 1 to 20 weight percent styrene-type monomer.

5. The composition of claim 1, wherein the nitrogen-containing compound is of Formula (V)

$$R_4NHR_1 \qquad (V)$$

wherein
   $R_1$ is hydrogen or an alkyl;
   $R_4$ is a group of formula —$R_5$—$NHR_6$, or —(C=NH)—$NH_2$;
   $R_5$ is an alkylene, (hetero)arylene, (hetero)aralkylene, heteroalkylene having one or more oxy (—O—) groups, or heteroalkylene having one or more —NH— groups, wherein the (hetero)arylene and (hetero)aralkylene are optionally substituted with a primary amino group and/or a secondary amino group; and
   $R_6$ is hydrogen, alkyl, or —(C=NH)—$NH_2$.

6. The composition of claim 1, wherein the nitrogen-containing compound is of Formula (VI)

$$R_7-(NHR_1)_z \qquad (VI)$$

wherein
   $R_1$ is hydrogen or alkyl;
   $R_7$ is a z-valent radical of an alkane or a z-valent radical of a heteroalkane; and
   z is an integer in a range of 3 to 10.

7. The composition of claim 1, wherein the nitrogen-containing compound has a molecular weight no greater than 2000 Daltons.

8. The composition of claim 1, wherein the polymeric sorbent further comprises an acid-base dye.

9. The composition of claim 1, wherein the polymeric sorbent is in a composite granule that comprises the polymeric sorbent and a binder.

10. A method of sorbing an aldehyde on a polymeric sorbent, the method comprising:
    providing a polymeric sorbent comprising a reaction product of
    a) a hydrolyzed divinylbenzene/maleic anhydride polymeric material having carboxylic acid groups; and
    b) a nitrogen-containing compound having at least two amino groups of formula —NHR wherein R is hydrogen or alkyl and wherein the nitrogen-containing compound is attached to the hydrolyzed divinylbenzene/maleic anhydride polymeric material with an ionic bond;
    sorbing the aldehyde on the polymeric sorbent, the aldehyde being of Formula (I)

$$R_2-(CO)-H \qquad (I)$$

wherein $R_2$ is hydrogen, alkyl, vinyl, or aryl and wherein the molecular weight of the aldehyde of Formula (I) is no greater than 200 grams/mole.

11. The method of claim 10, wherein $R_2$ is hydrogen or methyl.

12. The method of claim 10, wherein the polymeric sorbent sorbs an amount of aldehyde in a range of 0.5 to 15 millimoles per gram based on a weight of the polymeric sorbent.

13. The method of claim 10, wherein the polymeric sorbent comprises an acid-base dye and wherein the acid-base dye changes color when the aldehyde sorption capacity of the polymeric sorbent is reached or is close to being reached.

14. The method of claim 10, wherein the polymeric sorbent is in a composite granule that comprises the polymeric sorbent and a binder.

* * * * *

UNITED STATES PATENT AND TRADEMARK OFFICE
CERTIFICATE OF CORRECTION

PATENT NO. : 10,654,026 B1
APPLICATION NO. : 16/619347
DATED : May 19, 2020
INVENTOR(S) : Michael Wendland et al.

It is certified that error appears in the above-identified patent and that said Letters Patent is hereby corrected as shown below:

In the Specification

Column 1
Line 8, Delete "PCT/IB2048/054312," and insert -- PCT/IB2018/054312, --, therefor.

Column 2
Line 2, After "itself" insert -- . --.

Column 5
Line 47, Delete "pressures)(p/p°" and insert -- pressures(p/p°) --, therefor.

Column 12
Line 13, Delete "(2-methylproprionate))," and insert -- (2-methylpropionate)), --, therefor.

Column 16
Line 30, Delete "—HR." and insert -- —NHR. --, therefor.

Column 21
Line 25, Delete "polysacharides," and insert -- polysaccharides, --, therefor.
Line 29, Delete "polyquartenary" and insert -- polyquaternary --, therefor.
Line 33, Delete "quarternized" and insert -- quaternized --, therefor.

Column 25
Lines 13, 16, 17, 18, 20, 23, 25, 27, 28, 30, 40 both instances, 42, 45, 46 both instances, 48, 51, 53, 55, 56, 57, and 67, Delete "—COO$^{31}$" and insert -- —COO$^-$ --, therefor.

Column 26
Line 2, Delete "—(NHR$_{z-1}$)$^+$" and insert -- —(NHR$_1$)$_{z-1}$)$^+$ --, therefor.
Lines 4, 5, 6, 8, and 11, Delete "—COO$^{31}$" and insert -- —COO$^-$ --, therefor.

Signed and Sealed this
Fourteenth Day of July, 2020

Andrei Iancu
*Director of the United States Patent and Trademark Office*

CERTIFICATE OF CORRECTION (continued)
U.S. Pat. No. 10,654,026 B1

Column 28
Lines 12, 27, and 42, Delete "—COO$^{31}$" and insert -- —COO$^-$ --, therefor.

Column 30
Lines 31 and 48 both instances, Delete "—COO$^{31}$" and insert -- —COO$^-$ --, therefor.

Column 31
Line 15, Delete "NH$_2$—(C=NH)—N—R$_5$—NHR$_1$" and insert
-- NH$_2$—(C=NH)—HN—R$_5$—NHR$_1$ --, therefor.
Line 18 both instances, Delete "—COO$^{31}$" and insert -- —COO$^-$ --, therefor.
Line 18, Delete "—H—" and insert -- —NH— --, therefor.
Lines 32 and 47, Delete "—COO$^{31}$" and insert -- —COO$^-$ --, therefor.

Column 33
Line 9, Delete "polyvinyacetate," and insert -- polyvinylacetate, --, therefor.

Column 34
Line 16, Delete "pressure)(p/p°"" and insert -- pressure)(p/p°) --, therefor.

Column 38
Line 1, Delete "comparativesorbent" and insert -- comparative sorbent --, therefor.
Line 33, Delete "comparativesorbent" and insert -- comparative sorbent --, therefor.